US006917383B2

(12) United States Patent
Hamasaki et al.

(10) Patent No.: US 6,917,383 B2
(45) Date of Patent: Jul. 12, 2005

(54) IMAGE SENSING DEVICE

(75) Inventors: Takeshi Hamasaki, Osaka (JP); Koichi Toyomura, Osaka (JP); Shuji Yano, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 871 days.

(21) Appl. No.: 09/906,248

(22) Filed: Jul. 16, 2001

(65) Prior Publication Data
US 2002/0071039 A1 Jun. 13, 2002

(30) Foreign Application Priority Data

| Jul. 14, 2000 | (JP) | 2000-214057 |
| Sep. 12, 2000 | (JP) | 2000-275993 |
| Sep. 25, 2000 | (JP) | 2000-290370 |
| Oct. 30, 2000 | (JP) | 2000-330223 |

(51) Int. Cl.[7] .......................... H04N 9/68; H04N 5/247
(52) U.S. Cl. ...................... 348/264; 348/234
(58) Field of Search .............................. 348/234, 235, 348/262, 263, 264

(56) References Cited

U.S. PATENT DOCUMENTS

| 5,184,212 A | * | 2/1993 | Yamamoto et al. ......... 348/234 |
| 5,414,465 A | * | 5/1995 | Kodama et al. ............ 348/236 |
| 5,652,620 A | * | 7/1997 | Sugiura et al. ............ 348/236 |
| 5,657,082 A | * | 8/1997 | Harada et al. ............ 348/262 |
| 5,798,792 A |   | 8/1998 | Kusaka et al. |
| 5,982,984 A |   | 11/1999 | Inuiya |
| 6,522,356 B1 | * | 2/2003 | Watanabe ................. 348/272 |

FOREIGN PATENT DOCUMENTS

| EP | 0-476-421 A1 | 3/1992 |
| JP | 4-335780 | 11/1992 |
| JP | 5-268523 | 10/1993 |
| JP | 6-284349 | 10/1994 |
| JP | 09-116912 | 5/1997 |

OTHER PUBLICATIONS

European Search Report corresponding to application No. EP 01 11 7119 dated Aug. 18, 2004.

* cited by examiner

Primary Examiner—Wendy R. Garber
Assistant Examiner—Timothy J. Henn
(74) Attorney, Agent, or Firm—RatnerPrestia

(57) ABSTRACT

An image sensing device free from change in the angle of view between taking moving picture and taking still picture, small in power consumption in moving picture taking, and small in sensitivity drop if the size of the optical system is the same. The image sensing means has exclusive image sensing elements for red (R), green (G), and blue (B), and the three image sensing elements are disposed by shifting the pixels obliquely. Luminance signal generating means generates a first luminance signal of which number of pixels in the horizontal direction is 2 times that of the image sensing device for G, and generates a second luminance signal of which number of pixels in the horizontal direction is 2 times that of the image sensing device for G. Sampling frequency converting means decreases the sampling frequency at a specific ratio, and generates as a third luminance signal. Second memory means stores the first luminance signal and second luminance signal, and issues them alternately in every line. This image sensing device utilizes the output signal of the sampling frequency converting means as a moving picture output, and the output of the second memory means as a still picture output.

11 Claims, 18 Drawing Sheets

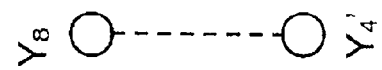
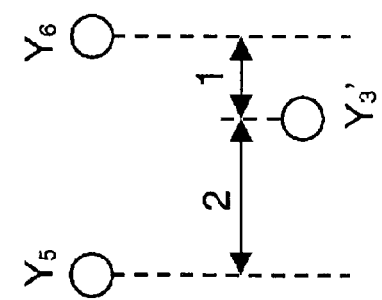
FIG. 4
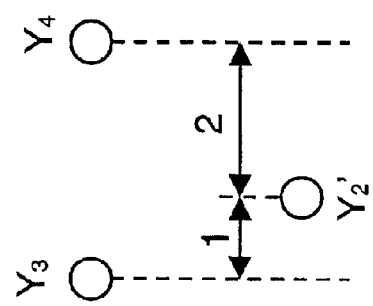
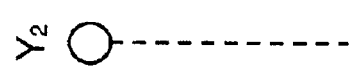

IMAGE SENSING DEVICE

FIELD OF THE INVENTION

The present invention relates to an image sensing device such as digital video camera and digital still camera.

BACKGROUND OF THE INVENTION

As the digital still camera becoming popular recently, the digital video camera originally designed for moving picture is also used in recording of still picture, and in such case the digital video camera is required to record a still picture at a picture quality as high as in the case of the digital still camera exclusive for still picture. However, the DV standard for moving picture specifies the number of output pixels of digital video camera. For example, the DV standard specifies the number of output pixels of the NTSC system as horizontal 720 pixels×vertical 480 pixels. Therefore, the conventional digital video camera, in the case of output of still picture, must generate in this number of pixels (720 pixels×480 pixels). As a result, the picture quality of still picture by the digital video camera is limited at a level equivalent to the VGA (640 pixels×480 pixels).

More recently, using a charge coupled device (CCD) of large number of pixels, other digital video camera capable of enhancing the picture quality of still picture and recording a moving picture is developed. In this case, when taking a moving picture, the digital video camera trims and puts out only part of pixels of the large number of pixels, and issues according to the number of pixels specified in the standard of digital VCR for consumer use (DV standard). In such prior arts, when taking a still picture, all pixels are used, and the picture quality of still picture is enhanced to a level equivalent to XGA (1024×768 pixels) or SXGA (1280×960 pixels). These prior arts are explained below.

FIG. 18 is a block diagram showing configuration of a conventional image sensing device, which is a single-CCD image sensing device. In the conventional image sensing device, using one CCD of multiple pixels, all pixels of the CCD 1 are used when taking a still picture, and some of the pixels necessary for the moving picture are cut out from the CCD 1 and used when taking a moving picture (trimming method). First, when taking a moving picture, the image sensing device discards signals corresponding to upper and lower ends of the screen taken by the CCD 1 by vertical high speed transfer, and utilizes only signals of vertical 480 pixels corresponding to the central area of the screen. Through an analog signal processing unit 2 and A/D converter 3, a matrix circuit 4 processes output signal of the CCD 1 sequentially, and, as a result, luminance signal (Y signal) and chrominance signal (C signal) are generated in the output of the matrix circuit 4. An electronic zoom circuit 5 discards signals corresponding to right and left ends of the screen of the output signals of the matrix circuit 4, zooms up by a proper magnification factor, and issues horizontal 720 pixels. Finally, the screen of the moving picture conforms to the DV standard of vertical 480 pixels and horizontal 720 pixels. When taking a still picture, the conventional image sensing device issues all pixels of the CCD 1, and if necessary, the electronic zoom circuit executes zoom process, converts into square pixels, and issues still picture image signals.

In the same configuration as in FIG. 18, the conventional image sensing device may also process to issue pixel signals corresponding to all pixels always from the CCD 1. In this case, in the moving picture, it is also possible to process to issue by shrinking in both horizontal and vertical directions (which is called shrink method).

Generally, the image sensing device of video camera is roughly classified into the single-CCD type and three-CCD type according to the unit number of the image sensing devices to use. In the single-CCD image sensing device uses one CCD device and it uses a color filter to obtain chrominance signals. The three-CCD image sensing device, by contrast, uses three CCD devices which generate R, G and B signals independently from each CCD. Therefore, it has such advantages as a high sensitivity, a high resolution, an excellent tone color, and further a wide dynamic range as compared with the single-CCD type. Moreover, the three-CCD image sensing device achieves an excellent high resolution, by shifting disposition of three CCDs in the two-dimensional position in the horizontal and vertical directions by ½ pixel each between the CCD for G and CCDs for R and B, that is, by the pixel shifting disposition method. However, so far, there is no effective method useful in both still picture and moving picture.

In the conventional image sensing device of such configuration, however, has the following problems.

First, in the trimming method, since only some of the pixels of the CCD 1 are used, the aspect of a picture in taking moving image is narrower than in taking still image.

In the shrink method, since all pixels of the CCD 1 are used also in taking moving picture, the aspect of a picture is not so narrower as compared with the case in taking still picture. However, in this case, the driving frequency of CCD in taking moving picture is high so as to increase its power consumption.

Further, in both methods, if the number of pixels of still picture is increased without changing the size of the optical system, the light receiving area per pixel is smaller, and the sensitivity of the CCD is lowered, and the picture quality deteriorates.

The invention is intended to solve these conventional problems, and it is hence an object thereof to realize an advantageous image sensing device not changed in the aspect of a picture between taking moving picture and taking still picture, capable of suppressing power consumption in taking moving image, and of no decrement of the sensitivity, by using the optical system of same size.

SUMMARY OF THE INVENTION

To solve these problems, the image sensing device of the invention comprises:

a) image sensing means having individual image sensing elements for red (R), green (G), and blue (B), in which three image sensing elements are arranged in an obliquely shifted disposition so that the image sensing element for G may be shifted from the image sensing elements for R and B by Ph/2+a and Pv/2+b, respectively, in the horizontal and vertical direction where Ph and Pv are pixel arrangement intervals of the image sensing elements in the horizontal and vertical direction respectively, a and b are positive constants satisfying the relation of 0<a<Ph/2 and 0<b<Pv/2;

b) luminance signal generating means, which processes the output signal of the image sensing means in such way i) that the luminance signal generating means may generate a first luminance signal of which number of pixels in the horizontal direction is 2 times that of the image sensing element for G by using pixel signals of the image sensing elements for R and B and the signal from the pixel of the image sensing element for G positioned at one of the closest lower left position and closest lower right position in space to the image sensing elements for R and B, and ii) that the luminance signal generating means may generate a second luminance signal of which number of pixels in the horizontal direction is 2 times that of the image sensing element for G by using pixel signals of the image sensing elements for R and B and the signal from the pixel of the image sensing element for G positioned at one of the closest upper left position and closest upper right position in space to the latter image sensing elements for R and B;

c) sampling frequency converting means, which reduces at least one sampling frequency in the horizontal direction and vertical direction of the first luminance signal at a specified ratio, and generates as a third luminance signal; and d) second memory means, which stores the first luminance signal and second luminance signal, and issues the first luminance signal and second luminance signal alternately in every line;

wherein the output signal of the sampling frequency converting means is a moving picture image sensing output, and the output of the second memory means is a still picture image sensing output.

BRIEF DESCRIPTION OF THE DRAWINGS

FIG. 4 is a conceptual diagram of sampling frequency converting process in the embodiment of the image sensing device of the invention.

DESCRIPTION OF THE PREFERRED EMBODIMENTS

Figure 1:
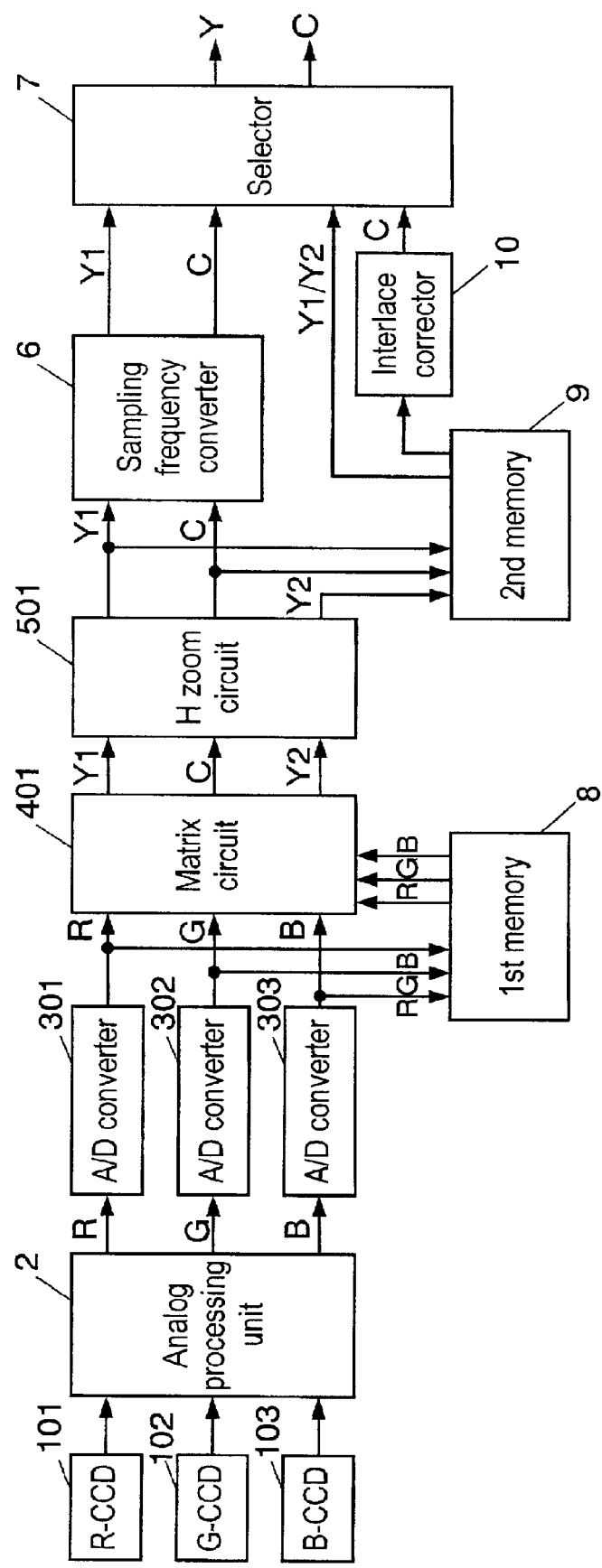
FIG. 1 is a block diagram showing an embodiment of an image sensing device according to the invention.

The image sensing device of the invention generates two luminance signals deviated vertically in space by ½ of the CCD vertical pixel interval, from the signals being read out from plural CCDs having the pixels shifted in an oblique direction. When taking a still picture, the two luminance signals are used as output signals, and when taking a moving picture, only one of the two luminance signals is used as output signal after sampling frequency conversion.

Referring now to the drawings, preferred embodiments of the invention are described below.

FIG. 1 is a block diagram showing an embodiment of an image sensing device according to the invention. CCDs 101 to 103 are interlacing CCDs for R, G, and B, respectively. First, the operation in moving picture taking mode is explained. For the sake of simplicity in explanation, in the CCD, it is supposed that the mutually adjacent vertical pixel signals are not added up.

An analog processing unit 2, and A/D converters 301, 302, and 303 respectively process the R signal, G signal, and B signal issued from the CCDs 101, 102, and 103, and convert into digital signals. A matrix circuit 401 processes the outputs from the A/D converters 301, 302, and 303, or R signal, G signal, and B signal from first memory means 8, and converts from these signals of three lines into two luminance signals Y1 and Y2 and one chrominance signal C. The operation of this matrix circuit 401 is shown below.

Figure 2:
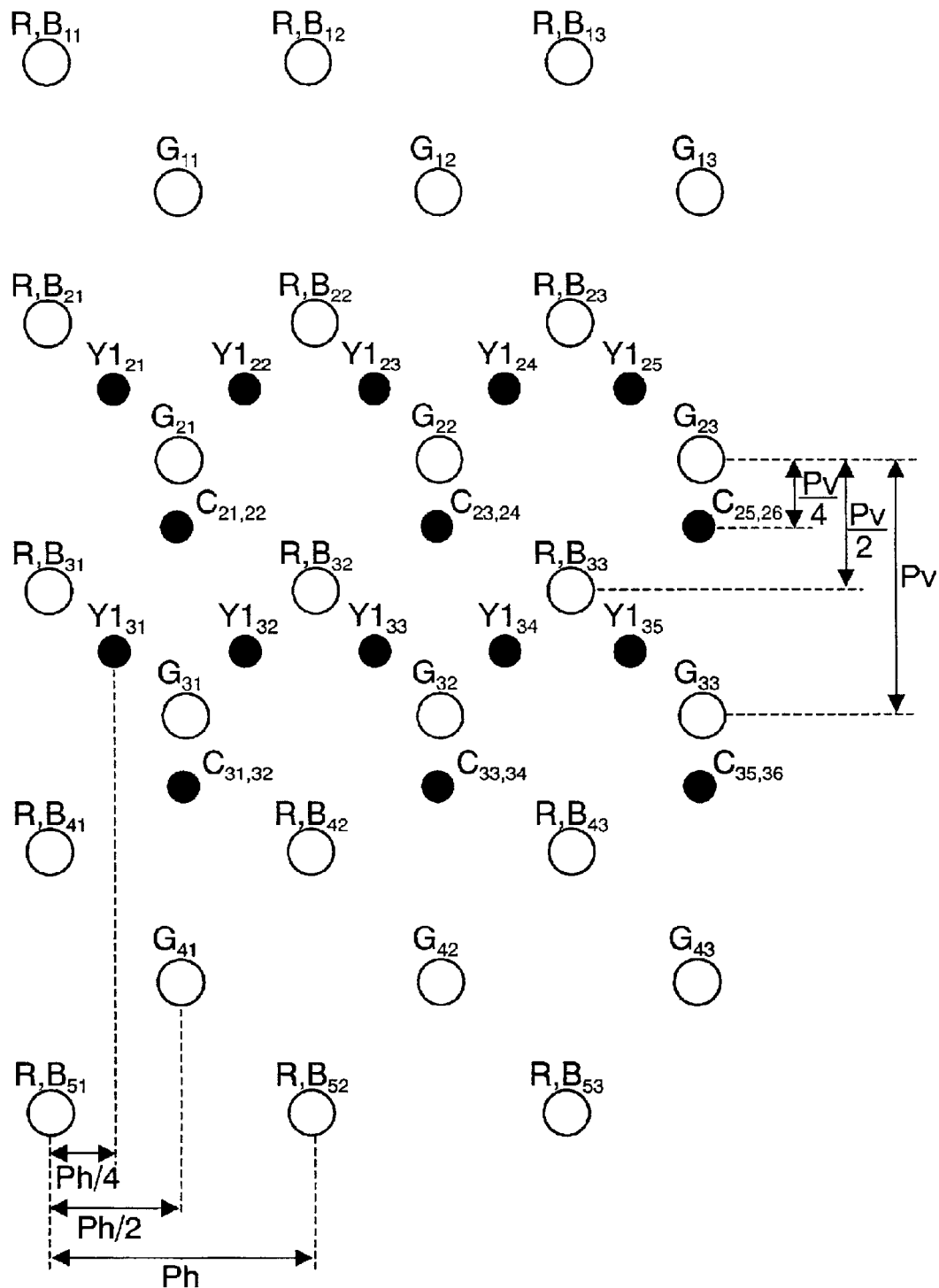
FIG. 2 is a schematic diagram showing a spatial configuration of pixels when taking a moving picture by using interlacing CCDs in the embodiment of the invention.

FIG. 2 shows a spatial configuration of pixels of interlacing CCDs 101, 102, and 103. In the case of using interlacing CCDs, the diagram shows a spatial configuration of pixels (indicated by circles) corresponding to R, G, and B signals in moving picture taking. By the pixels arranged in obliquely shifted disposition, G signal pixels $G_{11}$, $G_{12}$, $G_{13}$ are deviated, respectively, from R and B signal pixels $R_{11}$, $R_{12}$, $R_{13}$, and $B_{11}$, $B_{12}$, $B_{13}$ by the portion of ½ pixel obliquely in a lower right direction, that is, by Ph/2 in the horizontal direction, and Pv/2 in the vertical direction. Herein, since the CCDs 101, 102, and 103 are interlacing CCDs, at the time of signal output, pixels of G signals are read out in every other vertical pixel, that is, $G_{11}$, $G_{31}$, $G_{51}$ (not shown) in the odd field, and $G_{21}$, $G_{41}$, $G_{61}$ (not shown) in the even field. It is the same in R signal and B signal.

The matrix circuit 401 processes these R, G, and B pixel signals sampled at sampling frequency fs according to the matrix formula (formula 1), and obtains the value of Y signal of pixels $Y1_{21}$, $Y1_{22}$, . . . . This value, as Y1 signal, is sampled at double frequency 2fs, and issues to a next circuit.

$$Y1_{31}=0.30R_{31}+0.59G_{31}+0.11B_{31}$$

$$Y1_{32}=0.30R_{32}+0.59G_{31}+0.11B_{32} \qquad \text{[formula 1]}$$

Thus, the matrix circuit 401 determines the Y1 signal of each pixel, and obtains Y signals $Y1_{31}$, $Y1_{32}$, $Y1_{33}$, $Y1_{34}$, $Y1_{35}$, . . . (indicated by black spot) corresponding to a double number of pixels of G in the horizontal direction. For example, supposing the R, G, and B image sensing elements to have horizontal 768 pixels, the Y1 signal is a signal corresponding to horizontal 1536 pixels. At this time, assuming fs=15.75 MHz, the sampling frequency 2fs of output signal is 2fs=31.5 MHz.

Similarly, the C signal is obtained as shown in formula 2.

$$C_{31} = 0.70Rm - 0.59G_{31} - 0.11Bm$$
$$C_{32} = -0.30Rm - 0.59G_{31} + 0.89Bm \quad \text{[formula 2]}$$

where $$Rm = (R_{31} + R_{32} + R_{51} + R_{52})/4$$
$$Bm = (B_{31} + B_{32} + B_{51} + B_{52})/4$$

Figure 3:
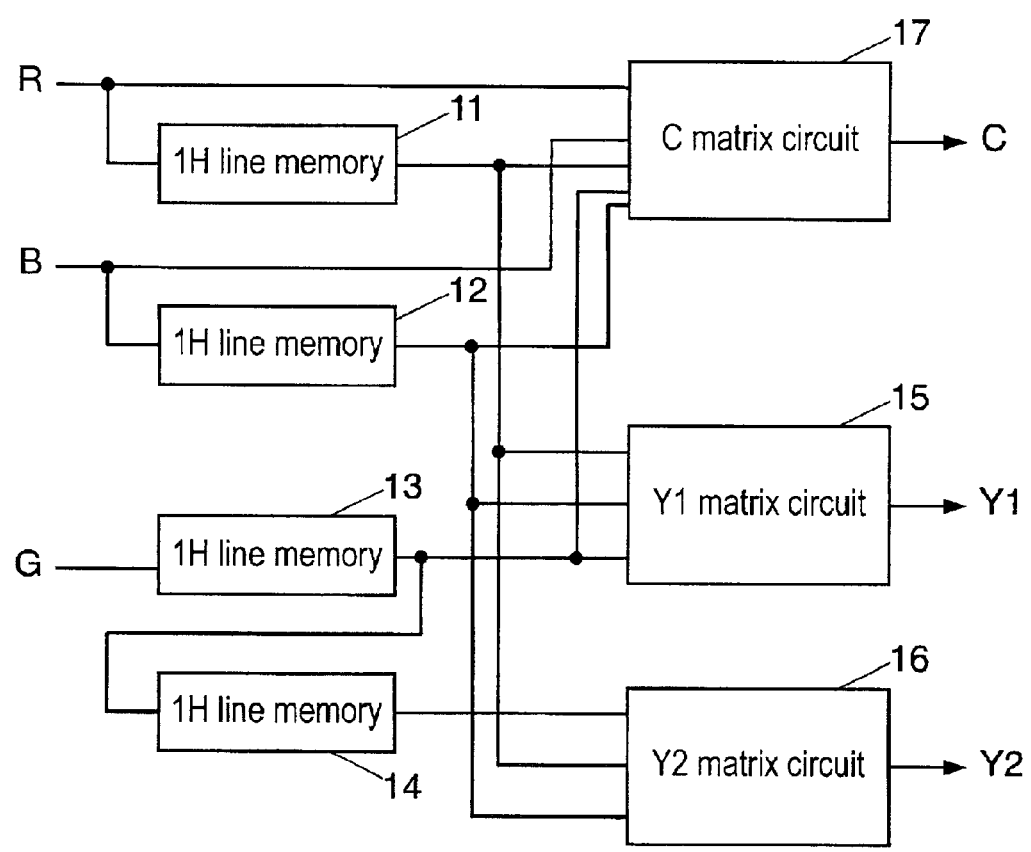
FIG. 3 is a block diagram of a matrix circuit used in the embodiment of the image sensing device of the invention.

FIG. 3 shows an internal structure of the matrix circuit 401. The matrix circuit 401 receives an R signal, and feeds it into a 1H line memory 11 (H: one scanning period in horizontal direction), and a C matrix circuit 17. Similarly, the matrix circuit 401 receives a B signal, and feeds it into a 1H line memory 12, and the C matrix circuit 17. The 1H line memory 11 feeds its output into a Y1 matrix circuit 15 and a Y2 matrix circuit 16. Similarly, the 1H line memory 12 feeds its output into the Y1 matrix circuit 15 and Y2 matrix circuit 16.

On the one hand, the matrix circuit 401 receives a G signal, and feeds it into a 1H line memory 13, and the 1H line memory 13 feeds its output into the Y1 matrix circuit 15, a C matrix circuit 17, and a 1H line memory 14. The 1H line memory 14 feeds its output into the Y2 matrix circuit 16.

The luminance signal Y1 matrix circuit 15 receives red pixel signals $R_{31}, R_{32}, \ldots$, blue pixel signals $B_{31}, B_{32}, \ldots$, and green pixel signals $G_{31}, G_{32}, \ldots$, respectively, from the 1H line memory 11, 1H line memory 12, and 1H line memory 13, and processes according to formula 1 so as to generate a luminance signal Y1. The other luminance signal Y2 matrix circuit 16 receives red pixel signals $R_{31}, R_{32}, \ldots$, blue pixel signals $B_{31}, B_{32}, \ldots$, and green pixel signals $G_{11}, G_{12}, \ldots$, respectively, from the 1H line memory 11, 1H line memory 12, and 1H line memory 14, and processes according to formula 1 so as to generate a luminance signal Y2. The chrominance signal C matrix circuit 17 receives red pixel signals R51, R52, ..., blue pixel signals B51, B52, ..., and 1H delayed signals of red pixel signals R31, R32, ..., blue pixel signals B31, B32, ..., and green pixel signals G31, G32, ..., from the R input, B input, the 1H line memory 11, 1H line memory 12, 1H line memory 13, respectively, so as to process them according to formula 2 to generate a chrominance signal C.

A horizontal zoom circuit 501 (shown as H zoom circuit in FIGS. 1, 7, 8, 9, and 10) zooms the luminance signals Y1 and Y2 and chrominance signal C generated from the matrix circuit 401 for adjustment of aspect of a picture. In the case of the DV standard, the camera output in taking moving picture must produce the Y signal of horizontal 720 pixels and vertical 480 pixels at a sampling frequency of 13.5 MHz. However, the driving frequency of CCD is generally different from 13.5 MHz, and it is necessary to convert the sampling frequency as described below. Herein, in order that the number of pixels after sampling frequency conversion may be horizontal 720 pixels, the ratio of number of horizontal pixels before and after conversion is set equal to the ratio of conversion of sampling frequency. For example, to convert the Y signal of horizontal 1536 pixels, vertical 480 pixels, and sampling frequency of 31.5 MHz, into a signal of horizontal 720 pixels, vertical 480 pixels, and sampling frequency of 13.5 MHz, since the frequency ratio is as shown in formula 3, the zoom factor is as shown in formula 4.

Before conversion:after conversion=31.5:13.5= 1680:720 [formula 3]

Zoom factor=1680/1536=1.093 times [formula 4]

A sampling frequency converter 6 converts the sampling frequency in the horizontal direction, in relation both to the luminance signal Y1 and chrominance signal C issued from the horizontal zoom circuit 501. This mode is shown in FIG. 4.

FIG. 4 is a conceptual diagram of sampling frequency conversion of luminance signal Y1. The diagram shows an example of converting the sampling frequency by 3/7. $Y_1, Y_2, \ldots$ are signal values of pixels corresponding to the luminance signal Y1 before conversion, and $Y_1', Y_2', \ldots$ are signal values of pixels of the $Y_1$ signal after conversion. The sampling frequency converter 6, first on based on the pixel of signal Y1, limits the band of the luminance signal $Y_1$ before conversion, and determines the signal value $Y_1'$ existing at the same position as the pixel $Y_1$. Next, the sampling frequency converter 6 limits the band of signal for $Y_2'$ corresponding to the position at distance of 1:2 from pixels of signals $Y_3$ and $Y_4$, respectively, and calculates the signal value $Y_2'$ by interpolation. Similarly, the sampling frequency converter 6 limits the band of signal for $Y_3'$ corresponding to the position at distance of 2:1 from pixels of signals $Y_5$ and $Y_6$, respectively, and calculates the signal value $Y_3'$ by interpolation. After the sampling frequency converter 6 repeats the operations for the other sampling points, and then it lowers the sampling frequency in the horizontal direction by 3/7. As a result, the sampling frequency converter 6 converts the luminance signal Y1 of horizontal 1680 pixels and sampling frequency of 31.5 MHz, into a luminance signal Y1 of horizontal 720 pixels and sampling frequency of 13.5 MHz. Conversion of sampling frequency of chrominance signal C is of the same concept, and its explanation is omitted.

The output of the sampling frequency converter 6 is put into a selector 7. The selector 7 selects and issues a moving picture signal or still picture signal. In moving picture taking, the selector 7 selects the output of the sampling frequency converter 6, and the luminance signal Y1 and chrominance signal C of moving picture signal are issued.

The mode of still picture taking is explained below.

Figure 5:
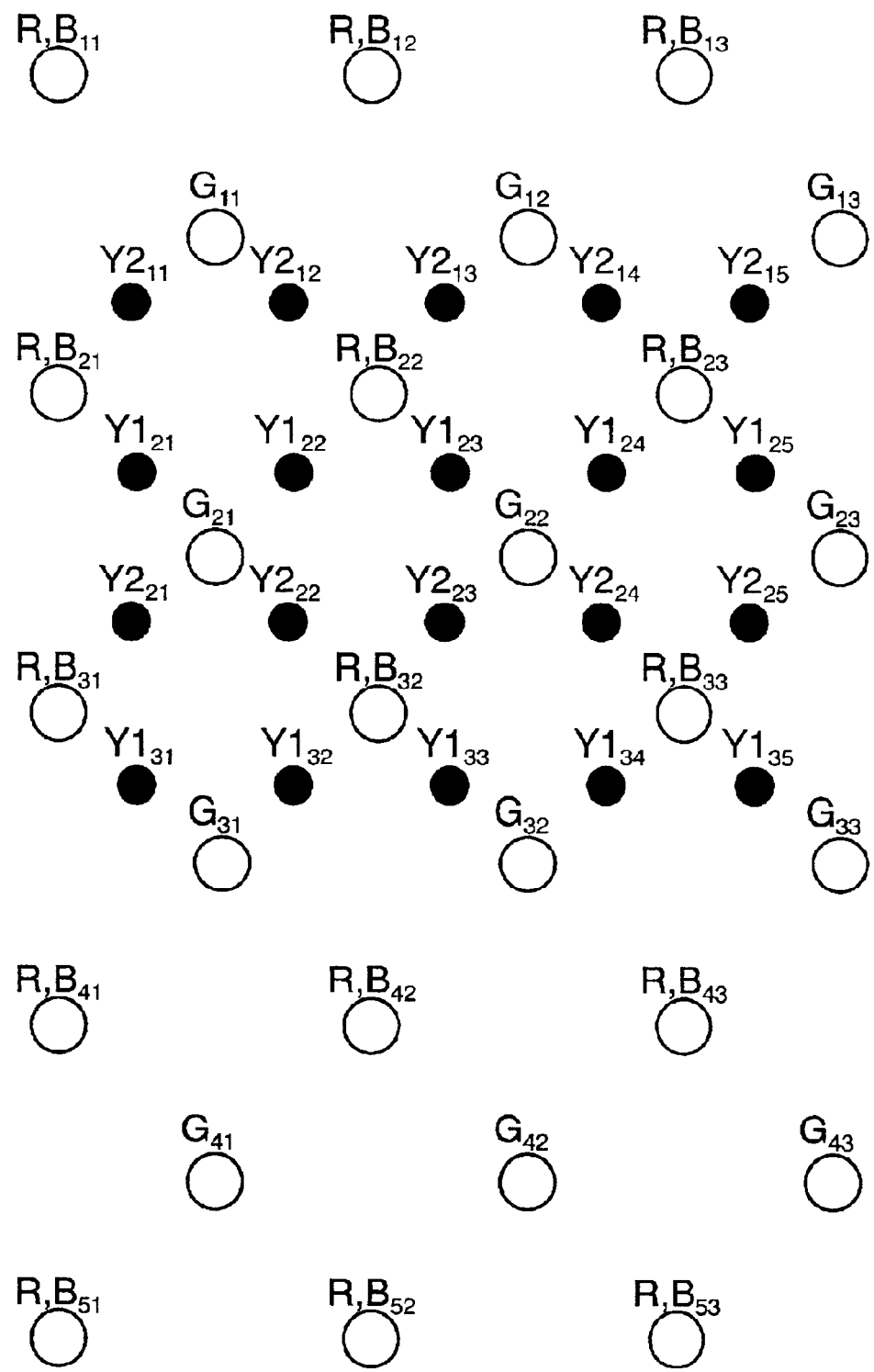
FIG. 5 is a schematic diagram showing a spatial configuration of pixels when taking a still picture by using interlacing CCDs in the embodiment of the invention.

FIG. 5 shows a spatial configuration of pixels corresponding to R, G, and B signals when taking a still picture by using interlacing CCDs.

In FIG. 5, R signals, G signals, and B signals are indicated by circles, and first luminance signals Y1 and second luminance signals Y2 are indicated by black spot. FIG. 5 is different from FIG. 2 only in that second luminance signals Y2 are provided, but is similar to FIG. 2 in other aspects.

The R, G, and B signals in the spatial configuration are scanned sequentially in every other pixel in the vertical direction from the CCD, as shown in FIG. 5. Pixels of G signals, for example, is scanned vertically in the sequence of $G_{11}, G_{31}, \ldots$, during odd fields, and is scanned vertically in the sequence of $G_{21}, G_{41}, \ldots$, during even fields. R signals and B signals are similarly scanned. That is, since signals of all pixels of the CCD cannot be scanned during one field period, they must be scanned during two field periods. Herein, the CCDs 101 to 103 feed these R signals, G signals, and B signals into first memory means 8 through the analog processing unit 2 and A/D converters 301, 302, and 303, during two field periods. As a result, the first memory means 8 memorizes the R signals, G signals, and B signals of all pixels.

The first memory means 8, for example in the case of pixels of G signals among RGB, issues G signals $G_{11}, G_{21}, G_{31}, G_{41}, \ldots$ in turn, towards the vertical direction, so as to reproduce the spatial disposition on the CCD. R signals and B signals are issued similarly to the G signals. The first memory means 8 feeds its output into the matrix circuit 401.

The matrix circuit 401 receives R, G, and B pixel signals from the first memory means 8 at the sampling frequency fs, calculates, according to formula 5, luminance signals $Y_{11}$, $Y_{12}$, ... for respective pixels from signals $R_{21}$, $R_{22}$, ... of red pixel R, signals $G_{21}$, $G_{22}$, ... of green pixel G, and signals $B_{21}$, $B_{22}$, ... of blue pixel B, so as to generate them as first luminance signal Y1 at sampling frequency 2fs.

$$Y1_{21}=0.30R_{21}+0.59G_{21}+0.11B_{21}$$

$$Y1_{22}=0.30R_{22}+0.59G_{21}+0.11B_{22} \quad \text{[formula 5]}$$

Similarly, the matrix circuit 401 receives R, G, and B pixel signals from the first memory means 8 at the sampling frequency fs, calculates, according to formula 6, luminance signals $Y2_{11}$, $Y2_{12}$, ... of pixels from signals $R_{21}$, $R_{22}$, ... of red pixel R, signals $G_{11}$, $G_{12}$, ... of green pixel G, and signals $B_{21}$, $B_{22}$, ... of blue pixel B, so as to generate them as second luminance signal Y2 at sampling frequency 2fs.

$$Y2_{11}=0.30R_{21}+0.59G_{11}+0.11B_{21}$$

$$Y1_{12}=0.30R_{22}+0.59G_{11}+0.11B_{22} \quad \text{[formula 6]}$$

Thus, the matrix circuit 401 can obtain Y signals having a double number of pixels of the green pixels G to the horizontal direction. Further, combining the first luminance signal Y1 and second luminance signal Y2, Y signals having a double number of pixels of the green pixels G are also obtained to the vertical direction. For example, in the case of each of R, G, B CCDs having horizontal 768 pixels and vertical 480 pixels, the matrix circuit 401 generates both first luminance signal Y1 and second luminance signal Y2 each having horizontal 1536 pixels and vertical 480 pixels. When the first luminance signal Y1 and second luminance signal Y2 are combined, the luminance signal Y of still picture is a signal of horizontal 1536 pixels and vertical 960 pixels. At this time, supposing the original sampling frequency fs to be 15.75 MHz, the output sampling frequency 2fs is 31.5 MHz.

On the other hand, the chrominance signal C is obtained only in one set of chrominance signal based on formula 7. As the human visual discrimination of color is not so high as that of luminance, in other words monochrome, multiple pixels enhancement are not needed, and it is enough to have one set of chrominance signal based on formula 7. As the position of chrominance signal C is same as that of green G signal, so it is not shown in FIG. 5.

$$C_{21}=0.70Rm-0.59G_{21}-0.11Bm$$

$$C_{22}-0.30Rm-0.59G_{21}+0.89Bm \quad \text{[formula 7]}$$

where $$Rm=(R_{21}+R_{22}+R_{31}+R_{32})/4$$

$$Bm=(B_{21}+B_{22}+B_{31}+B_{32})/4$$

The horizontal zoom circuit 501 converts the output pixel signal of the matrix circuit 401 into square pixel signal. This square pixel conversion is explained. Generally, the CCD for digital still camera has an equal pixel interval between the horizontal and vertical directions. This arrangement is called as square pixel arrangement. By contrast, the CCD for video camera differs in the pitch of pixels, and generally the pitch of the horizontal directions is shorter than that of the vertical direction. Therefore, when such CCD signals by the video camera are directly displayed in the personal computer screen which displays an image lengthened in the lateral direction, in other words, an image shortened in the vertical direction. Accordingly, in this case, it is necessary for the horizontal zoom circuit 501 to zoom the image electronically in the horizontal direction, and to adjust the pitch of horizontal pixels to be equal to that of vertical pixels both for the luminance signal Y and for the chrominance signal C, so as to be in square pixel arrangement on the personal computer screen. In other words, it is therefore necessary to adjust the ratio of the number of pixels in the horizontal and vertical direction at 4:3 so that the square pixel arrangement may conform to the personal computer screen with the aspect ratio of 4:3. In the case of CCD of the luminance signal Y of horizontal 1536 pixels and vertical 960 pixels, the horizontal zoom circuit 501 zooms in the horizontal direction by about 0.83(=1280/1536) times, so as to obtain an image signal of square pixels, consisting of horizontal 1280 pixels and vertical 960 pixels.

The second memory means 9 memorizes output signals of the horizontal zoom circuit 501. As a result, the second memory means 9 memorizes Y and C signals after square pixel conversion, that is, Y1, Y2, and C signals having horizontal 1280 pixels and vertical 480 pixels.

The second memory means 9 generates the first luminance signal Y1 and second luminance signal Y2 alternatively, in such way that at first it generates the second luminance signal Y2 positioned higher in space, and then generates luminance signals Y for the portion of vertical 960 pixels in the sequence of Y2, Y1, Y2, Y1, Y2, ..., alternatively, for every scanning lines. This sequence of the luminance signal is put into the selector 7.

On the other hand, the chrominance signal C (or C signal) from the second memory means 9 is put into an interlace corrector 10.

The interlace corrector 10 interpolates the C signal of vertical 480 pixels in the vertical direction, so as to generates C signal of vertical 960 pixels.

Figure 6:
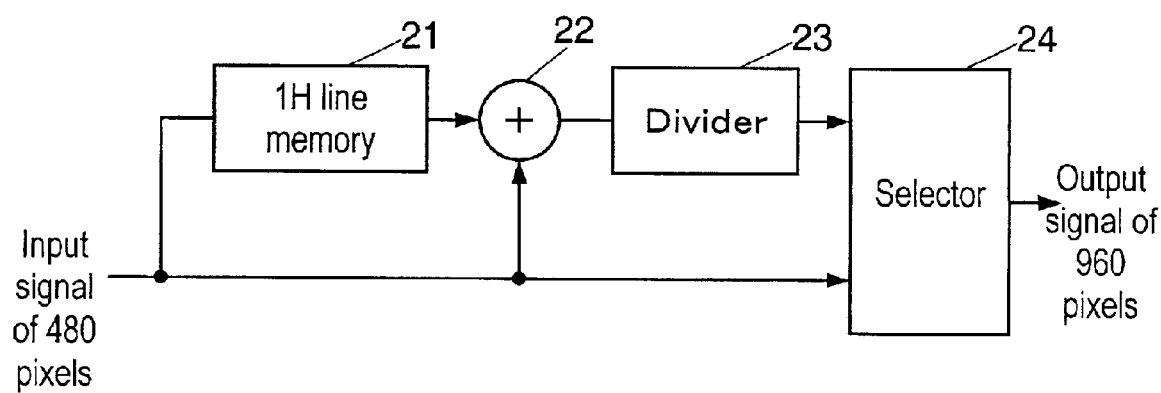
FIG. 6 is a block diagram of an interlace corrector in the embodiment of the invention.

FIG. 6 shows an internal structure of the interlace corrector 10.

The interlace corrector 10 receives a C signal, and feeds it into a 1H line memory 21, an adder 22, and a selector 24. The 1H line memory 21 delays the C signal by 1H period. The adder 22 adds the input C signal and the C signal delayed by 1H period. A divider 23 divides the summed signal by 2, and puts the results into the selector 24. The selector 24 selects either one of the input C signal or output signal of the divider 23 in every 1H period and issues selected one. The output C signal of the interlace corrector 10 is put into the selector 7.

The selector 7 selects the output of the second memory means 9 and the output of the interlace corrector 10 in taking still picture, and issues the still picture image signal as camera output. As a result, image signal outputs of still picture are luminance signal Y and chrominance signal C of horizontal 1280 pixels and vertical 960 pixels.

Having such configuration, the embodiment is advantageous in the following points: the output image signal is not changed in the aspect of a picture between the taking moving picture mode and taking still picture mode; the CCD driving frequency is equalized between the taking still picture mode and taking moving picture mode; by parallel processing of the first luminance signal Y1 and second luminance signal Y2, the sampling frequency is equalized between the taking still picture mode and taking moving picture mode, so that the power consumption can be suppressed; by stopping the driving signal for processing of second luminance signal Y2 that is not necessary in taking moving picture mode, the power consumption can be further saved; and in the three-CCD system of the invention, the number of pixels of the each CCD necessary for still picture is only ¼ compared with that of the single-CCD system. As a result, in the optical system of a same size, the pixel area can be increased up to 4 times compared with the pixel area of the single-CCD system, so the image sensing device of the invention is advantageous in the aspect of the sensitivity, or, the S/N ratio. In other words, when the sensitivity is the same, the size of the optical system can be small one, so that the total device can be small in size.

In this embodiment, in taking moving picture, adjacent vertical pixels are not driven simultaneously in interlacing CCDs, but when driving adjacent vertical pixels simultaneously, same effects are expected by driving $G_{11}$ and $G_{21}$, $G_{31}$ and $G_{41}$, . . . simultaneously in odd fields, and driving $G_{21}$ and $G_{31}$, $G_{41}$ and $G_{51}$, . . . simultaneously in even fields.

The first memory means 8 and second memory means 9 are not always required to be separate ones, but these memory means may be realized by one memory means having two different regions for each memory means.

Thus, when using interlacing CCDs, signals of all pixels cannot be issued within one V period (V: vertical scanning period), but signal of all pixels are issued in twice period of 2V Accordingly, in taking still picture, in order to avoid difference in the pixel signal level issued in the first V period and second V period, the CCD must be shielded in the 2V period for issuing the pixel signal from the CCD. Accordingly, it may be required to use a diaphragm for a shutter for the purpose of shielding. However, use of mechanical shutter is not advantageous in the speed of successive multi-image taking. Accordingly, the following configuration may be considered for better solusion.

Figure 7:
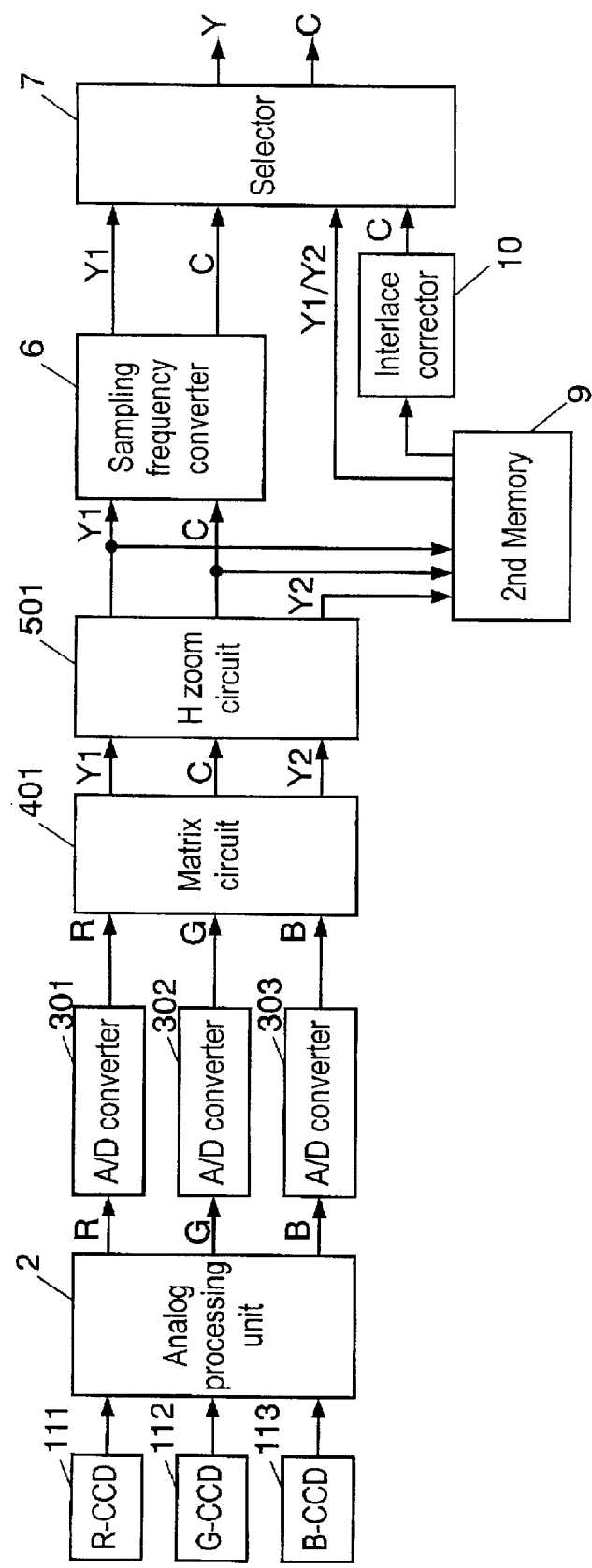
FIG. 7 is a block diagram showing other embodiment of an image sensing device according to the invention.

FIG. 7 is a block diagram showing other embodiment of the image sensing device. Herein, CCDs 111, 112, and 113 are progressive CCDs for R, G and B.

An analog processing unit 2, and A/D converters 301, 302, and 303 process the R signal, G signal, and B signal issued from the CCDs 111, 112, and 113, and convert into digital signals, respectively. A matrix circuit 401 processes the outputs from the A/D converters 301, 302, and 303, and R signal, G signal, and B signal from first memory means 8, so as to converts these three RGB signals into two luminance signals Y1 and Y2 and one chrominance signal C. The operation of this matrix circuit 401 is shown below.

A matrix circuit 401, same as in the embodiment in FIG. 1, calculates and issues first luminance signal Y1 and second luminance signal Y2 according to formula 5 and formula 6, and chrominance signal C according to formula 7, from R signal, G signal, and B signal at the respective positions in two dimensional space shown in FIG. 5. As the structure and operation of the matrix circuit 401 are same as in the embodiment in FIG. 1, as shown in FIG. 3, so their explanations are omitted.

Since the CCDs 111, 112, and 113 are progressive CCDs, pixels of G signals issued from these CCDs are deviated by ½ pixel from the pixels of R signals and B signals both in horizontal direction and in vertical direction. Therefore, unlike the case of interlacing CCDs, it is not necessary to store the outputs from the CCDs 111, 112, and 113 once in the memory means before putting into the matrix circuit 401. Moreover, since the CCDs 111, 112, and 113 issue signals of all pixels during 1V period, it is not necessary partly to shield the CCDs from light leakage, and then the shutter mechanism as in the case of FIG. 1 is not needed. At this time, the positions of the first luminance signal Y1 and second luminance signal Y2 in two dimensional space are same in FIG. 5. As the position of C signal is same as that of G signal in FIG. 5, so position of C signal is not hence shown in the diagram.

A horizontal zoom circuit 501 processes the output of the matrix circuit 401 by horizontal zooming to match the aspect of a picture in taking moving picture and to match square pixels in taking still picture, similar to the embodiment in FIG. 1. The output of the horizontal zoom circuit 501 is put into a sampling frequency converter 6 and second memory means 9.

The sampling frequency converter 6 converts the sampling frequency in taking moving picture same as in the embodiment in FIG. 1.

Supposing the number of pixels of the progressive CCDs 111, 112, and 113 to be horizontal 768 pixels and vertical 480 pixels with their driving frequency at 31.5 MHz, the matrix circuit 401 issues a signal of horizontal 1536 pixels having sampling frequency of 63 MHz. At this time, the horizontal zoom circuit 501 issues a signal of horizontal 1680 pixels having sampling frequency of 63 MHz, and the sampling frequency converter 6 obtains a progressive video output of horizontal 720 pixels having sampling frequency of 27 MHz.

The second memory means 9 memorizes output signals of the horizontal zoom circuit 501 for square pixel conversion in taking still picture. As a result, the second memory means 9 obtains, after square pixel conversion, the first luminance signal Y1, second luminance signal Y2, and C signal in horizontal 1280 pixels and in vertical 480 pixels.

The second memory means 9 issues the first luminance signal Y1 and second luminance signal Y2 alternately, in other words, issues first the second luminance signal Y2 positioned higher in vertical position, and then issues successively luminance signals for the position of vertical 960 pixels alternately in the sequence of Y2, Y1, Y2, Y1, Y2, . . . . These outputs are put into a selector 7.

On the other hand, the C signal output from the second memory means 9 is put into an interlace corrector 10.

The interlace corrector 10, same as in FIG. 1, interpolates the C signal of vertical 480 pixels in the vertical direction, so as to issues a double C signal of vertical 960 pixels. The selector 7 is same as in FIG. 1. As the structure and operation of the interlace corrector 10 are same as the structure and operation in the embodiment in FIG. 1, as shown in FIG. 6, so the explanation of it is omitted.

In the taking still picture mode, the selector 7 selects the output of the memory means 9 and the output of the interlace corrector 10, so as to issue a still picture image signal as camera output. As a result, the still picture image signal output is composed of luminance signal Y and C signal of horizontal 1280 pixels and vertical 960 pixels, so that a high-definition still picture signal is obtained.

In this configuration, as the image sensing device does not require shutter mechanism or other CCD shielding means in taking still picture, so this configuration can realize to use signals of all of the pixels of CCDs in taking still picture. Moreover, the image sensing device can much enhance the taking speed of successive multi-image in taking still picture. Further, in taking moving picture, the image sensing device obtains a progressive moving picture output having high picture quality.

As mentioned herein, in this image sensing device, the CCD for G is arranged in a shifted disposition from the CCDs for R and B in horizontal direction and vertical direction, and it also generates two lines of Y signals having a double number of pixels of R, G, B in the horizontal direction, and corresponding to the position shifted by ½ pixel in the vertical direction, by parallel processing. As a result, the image sensing device issues two luminance signals Y1 and Y2 in taking still picture, and issues only one set of luminance signal Y1 in taking moving picture by converting the sampling frequency.

Hence, the image sensing device of the embodiment has the following advantages: the aspect of a picture is not changed between the taking moving picture mode and taking still picture mode; the CCD driving frequency is equalized between the taking still picture mode and taking moving picture mode; the driving frequency is not so high that the power consumption is suppressed; in the three-CCD system of the invention, the number of pixels of CCD necessary for still picture is ¼ compared with that of the single-CCD type; As a result, in the optical system of a same size, the pixel area can be increased up to 4 times compared with the pixel area of the single-CCD system, and it is advantageous in the aspect of the sensitivity, or, the S/N ratio; In other words, when the sensitivity is the same, the size of the optical system can be small one, so that the device can be small in size. In the image sensing device of the embodiment in FIG. 7, since the progressive CCDs are used for RGB CCDs, in addition to the benefits of the embodiment in FIG. 1, such following merits are obtained: that the image sensing device does not require CCD shielding means; and, as a result, that the image sensing device of FIG. 7 can much enhance the taking speed of successive multi-image in taking still picture.

In these two foregoing embodiments, the image sensing device is designed to select either the signal for moving picture or the signal for still picture by using the selector 7, but the image sensing device may be also designed to process the signal for moving picture and the signal for still picture independently.

Figure 8:
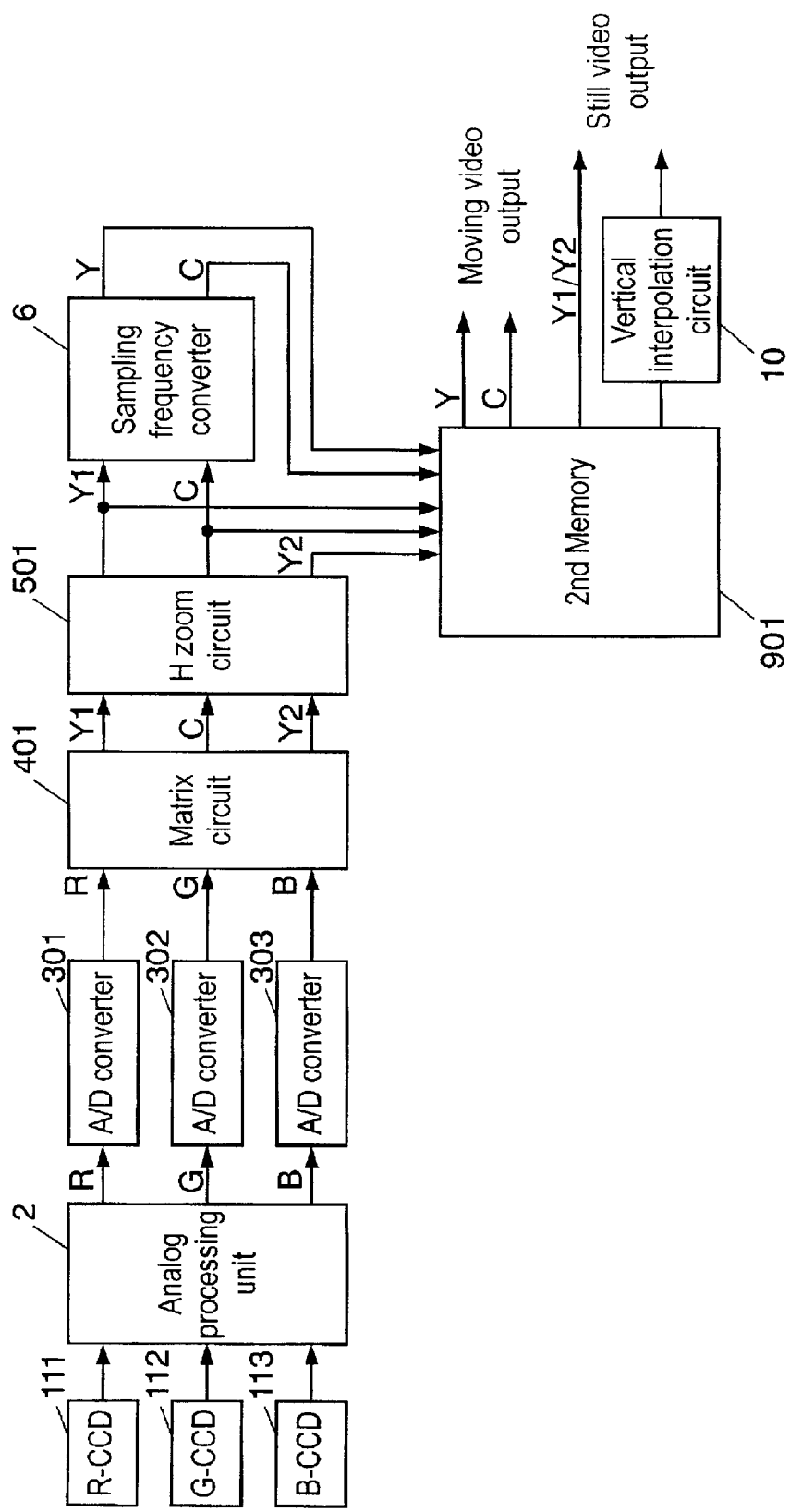
FIG. 8 is a block diagram showing a different embodiment of an image sensing device according to the invention.

FIG. 8 is a block diagram of such embodiment.

FIG. 8 shows an embodiment of an image sensing device in a second aspect of the invention. In this embodiment of FIG. 8 using progressive CCDs, the output signals of taking moving picture in FIG. 7 are once stored in a memory 901, and progressive signals and interlacing signals are selected and issued from this memory 901.

In FIG. 8, as the structure and operation from the CCDs 111, 112, and 113 to sampling frequency converter 6 are same as in the embodiment in FIG. 7, so the explanation is omitted.

A memory 901 stores progressive moving video output from the sampling frequency converter 6. The memory 901 may issue the stored signals sequentially in every line as progressive signals, or may issue in every other line as interlacing signals. In the case of output of high-definition still picture, it is same as in the case of FIG. 7, and the explanation is omitted.

As explained herein, in this embodiment, the CCD for G is arranged in a shifted disposition from the CCDs for R and B in the horizontal and vertical directions, and it also generates two lines of Y signals having a double number of pixels of R, G, B in the horizontal direction, and corresponding to the position shifted by ½ pixel in the vertical direction, by parallel processing. The image sensing device issues two sets of luminance signals Y1 and Y2 by storing in the memory in still picture processing, and issues only one set of luminance signal Y1 in moving picture taking by converting the sampling frequency.

Therefore, in addition to the benefits of the foregoing embodiments, this image sensing device has the following merits: in this image sensing device, the majority of circuits for moving picture processing and still picture processing can be commonly used; and the image sensing device is capable of performing moving picture processing and high-definition still picture processing simultaneously, so that a high-definition still picture can be taken simultaneously while taking a moving picture. In the explanation of these two embodiments, for the convenience of explanation, the pixels of CCD for G are shifted by ½ pixel in the horizontal direction and vertical direction, from pixels of CCDs for R and B. Actually, however, due to effects of chromatic aberration of the optical system or the like, the physical spatial position of ½ pixel on the CCD photo detecting surface and the optical spatial position of ½ pixel do not always coincide with each other. Therefore, the pixels of CCD for G should be shifted from pixels of CCDs for R and B in the horizontal direction and vertical direction, preferably by optical ½ pixel, instead of physical ½ pixel. In other words, three image sensing elements R, G, and B are arranged in an obliquely shifted disposition so that the image sensing element for G may be shifted from the image sensing elements for R and B by $Ph/2+a$ and $Pv/2+b$, respectively, in the horizontal and vertical direction where Ph and Pv are pixel arrangement intervals of the image sensing elements in the horizontal and vertical direction respectively, a and b are positive constants satisfying the relation of $0<a<Ph/2$ and $0<b<Pv/2$.

Figure 9:
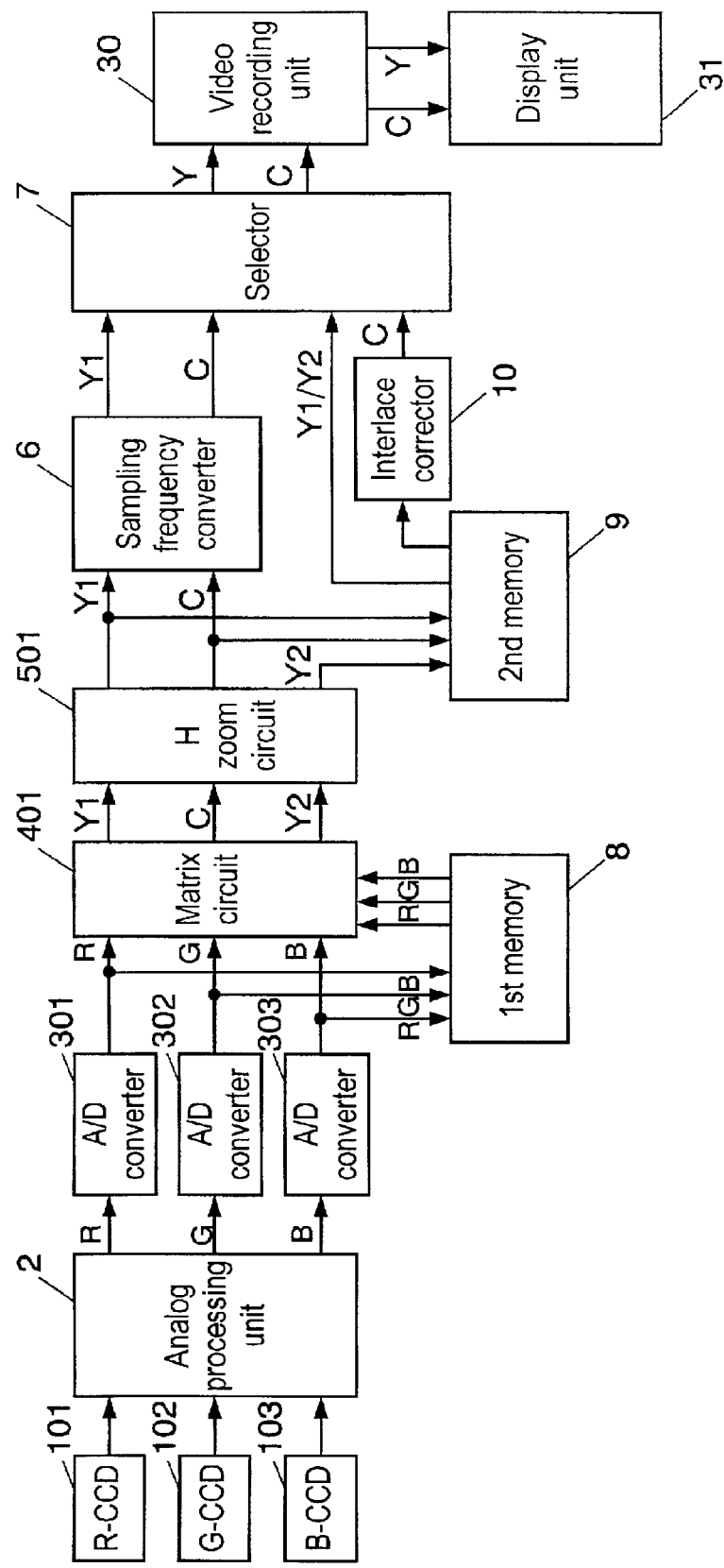
FIG. 9 is a block diagram showing another embodiment of an image sensing device according to the invention.

FIG. 9 is a block diagram of a different embodiment of image sensing device. CCDs 101, 102, and 103 are interlacing CCDs for R, G, and B, respectively. In FIG. 9, as the structure and operation from the block of CCDs 101, 102, and 103 to the block of selector 7 are same as those of the CCDs 101, 102, and 103 to that of selector 7 in FIG. 1, so the explanation is omitted.

Whether the image sensing device is in taking still picture mode or in taking moving picture mode, a video recording unit 30 records video signals from the selector 7 in an internal recording medium. Whether they are recorded in the video recording unit 30 or not, a display unit 31 displays the video signals from the selector 7 or the video recording unit 30.

Figure 10:
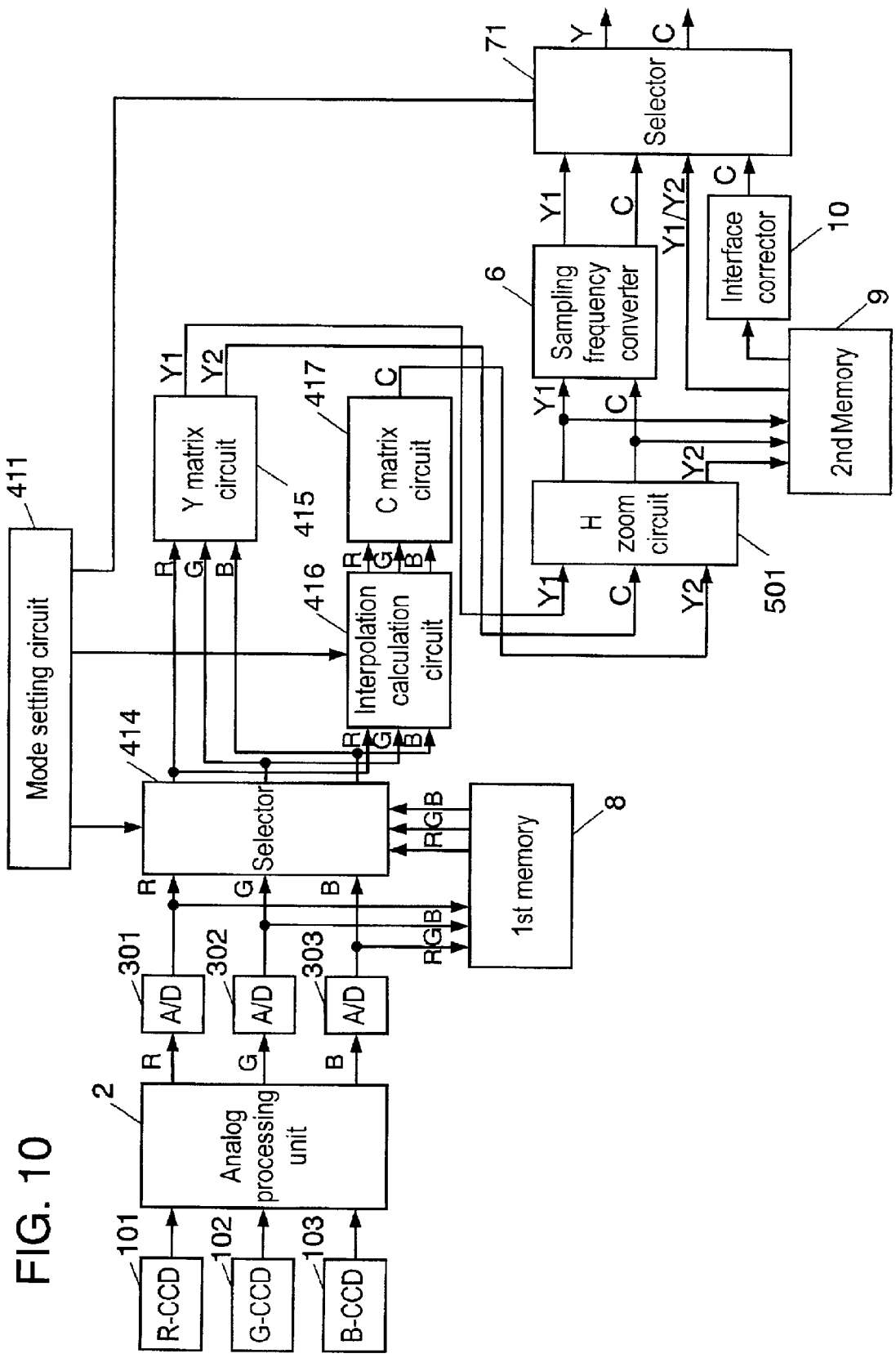
FIG. 10 is a block diagram showing a further embodiment of an image sensing device according to the invention.

The video recording unit 30 and display unit 31 can be also applied in the foregoing embodiments in FIG. 1, FIG. 7, and FIG. 8, or in an embodiment in FIG. 10.

In addition to the above effects, the image sensing device of the embodiment has such advantages: that the image sensing device continues to record or display the picture always while taking a picture; and that, therefore, if shifting from taking moving picture mode to taking still picture mode, the image sensing device can record and display the picture without interruption.

In the image sensing devices in FIG. 1 and FIG. 9, using three interlacing CCDs, pixels of three CCDs are shifted to oblique the direction. In these image sensing devices, a spurious color may be generated in the C signal in taking moving picture. For instance, in these image sensing devices, spatial positions of R signal and B signal of output of matrix processing for chrominance signal are shifted from the G signal by ¼ pixel in the vertical direction. Accordingly, for example, in these image sensing devices, when taking a picture having a sharp vertical edge in achromatic color, i.e in black and white, a spurious color is generated in the vertical edge portion.

An embodiment in FIG. 10 solves this problem, by shifting the position of the pixels properly by using three-CCD interlacing system. This image sensing device is capable of issuing pictures of high quality picture without obvious spurious color both in taking moving picture mode and taking still picture mode. The image sensing device in FIG. 10 interpolates the C signal, and changes the spatial positions of interpolation output signals in taking moving picture mode and taking still picture mode, by a specific interval.

FIG. 10 is intended to eliminate occurrence of spurious color, and is basically same as a block diagram of image sensing device in other embodiments of the invention.

FIG. 10 is similar to FIG. 1 and FIG. 9 in its basic structure and configuration of respective units. Three interlacing CCDs 101, 102, and 103 are image sensing means for R, G, and B, respectively, and they are same as the image sensing means which are CCDs shown in FIG. 1 and FIG. 9. An analog processing unit 2, A/D converters 301, 302, and 303, first memory means 8, a horizontal zoom circuit 501, a sampling frequency converter 6, second memory means 9, and an interlace corrector 10 are same as those shown in FIG. 1 and FIG. 9 in configuration and function thereof. Explanation of these units are omitted herein.

The matrix circuit 401 in FIG. 1 and FIG. 9 is corresponds to a block comprising a mode setting circuit 411, a selector 414, an interpolation calculation circuit 416, Y signal matrix circuit 415, and C signal matrix circuit 417 in the embodiment in FIG. 10. These units are explained. A/D converter 301 to 303 convert the output from the analog processing unit 2 into digital signals. First memory 8 stores the outputs of the A/D converters 301 to 303. Selector 414 selects one of the outputs from the A/D converters 301, 302, and 303, and output from the first memory means 8, and issues selected one to a later stage. The Y signal matrix circuit 415 processes the R, G, and B signals of output from the selector 414, and generates two sets of luminance signals Y1 and Y2. The interpolation calculation circuit 416 interpolates the R, G, and B signals of output from the selector 414 in horizontal and vertical directions, so as to generate R, G, and B signals for pixels at interpolation positions. The C signal matrix circuit 417 processes the R, G, and B signals of output from the interpolation calculation circuit 416, so as to generate one set of chrominance signal C. The mode setting circuit 411 judges whether the image sensing device is presently taking still picture or moving picture, so as to issues a mode setting signal. Consequently, the selector 7 selects either of the moving picture signal or still picture signal based on this mode setting signal, and generates the luminance signal Y and chrominance signal C of the selected image.

Figure 11:
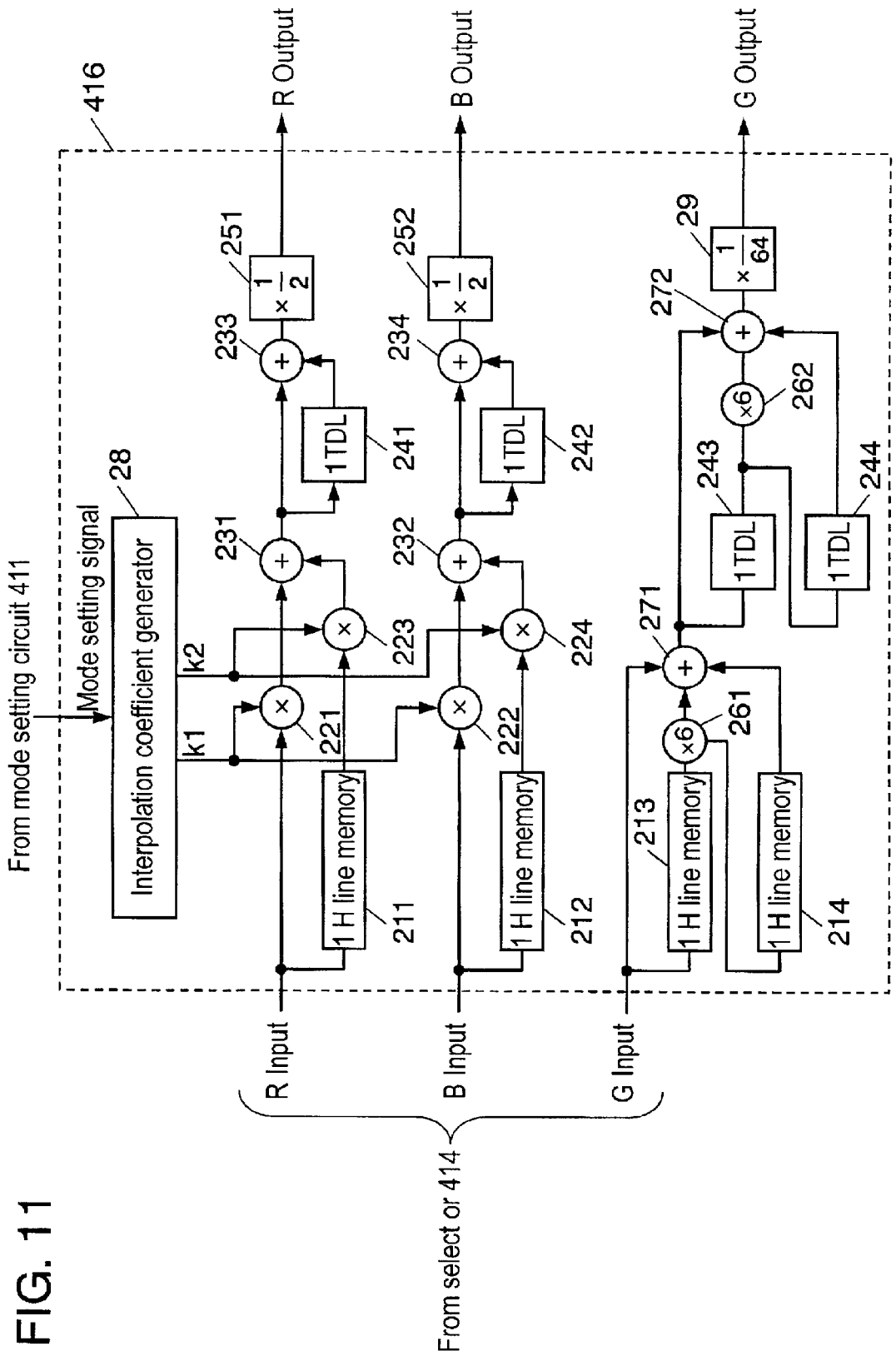
FIG. 11 is a block diagram showing an interpolation calculating circuit in the embodiment of the invention in FIG. 10.

FIG. 11 is a block diagram showing a specific structural example of the interpolation calculation circuit 416 shown in FIG. 10. In the diagram, 1H (one horizontal scanning) line memories 211, 212, and 213 delay R, G, and B signals issued from the selector 414 by one horizontal scanning period (1H) each respectively. Another 1H line memory 214 delays the G signal output from the 1H line memory 213 further by 1H period.

An interpolation coefficient generator 28 generates interpolation coefficients k1 and k2 depending on the mode setting signal from the mode setting circuit 411, and it sends the coefficient k1 to multipliers 221 and 222, and it sends coefficient k2 to multipliers 223 and 224. The multipliers 221 and 222 multiply the R signal and B signal from the selector 414 by the coefficient k1 generated by the interpolation coefficient generator 28, respectively. The multipliers 223 and 224 multiply the signals issued from the 1H line memories 211 and 212 by the coefficient k2 generated by the interpolation coefficient generator 28, respectively. An adder 231 adds the output of the multiplier 221 to the output of the multiplier 223, and an adder 232 adds the output of the multiplier 222 to the output of the multiplier 224. 1T (one clock) delay lines (1TDLs) 241 and 242 delay the outputs of the adders 231 and 232 by one clock (1T) period each. An adder 233 adds the output of the adder 231 to the output of 1T delay line 241, and an adder 234 adds the output of the adder 232 to the 1T delay line 242. Bit shifters 251 and 252 shift the outputs of the adders 233 and 234 by 1 bit each, in other words, amplify them by ½ times, and issue R signal and B signal.

A multiplier 261 multiplies the output of the 1H line memory 213 by coefficient "6". An adder 271 adds up the G signal input from the selector 414, the output of the multiplier 261, and the output of the 1H line memory 214. The 1TDL 243 delays the output from the adder 271 by 1T. Other 1TDL 244 delays the output from the 1TDL 243 further by 1T. A multiplier 262 multiplies the output of the 1TDL 243 by coefficient "6". An adder 272 adds up the output of the adder 271, the output of the multiplier 262, and the output of the 1TDL 244. A bit shifter 29 shifts the output of the adder 272 by 6 bits, in other words, multiplies its amplitude by 1/64 times.

First, the operation of the image sensing device in taking still picture is explained. As spatial positions of R, G, and B signals of the interlacing CCDs 101, 102, and 103 are same as in FIG. 5, and hence detailed description is omitted herein. The first memory 8 stores R, G, and B signals of all pixels of the CCDs 101, 102, and 103. In this case of taking still picture, the mode setting circuit 411 generates a mode setting signal for taking still picture, and the selector 414 selects the output from the first memory 8. As a result, the selector 414 issues R, G, and B signals for reproducing the spatial positions on the CCD as shown in FIG. 5.

A Y matrix circuit 415 receives R, G, and B pixel signals from the first memory means 8 at sampling frequency fs, and calculates luminance signals $Y_{11}$, $Y_{12}$, ... of each pixel, according to formula 5, from signals $R_{21}$, $R_{22}$, ... of red pixel R, signals $G_{21}$, $G22$, ... of green pixel G, and signals $B_{21}$, $B_{22}$, ... of blue pixel B, and issues the calculated results as Y1 signal at sampling frequency 2fs.

Similarly, the Y matrix circuit 415 receives R, G, and B pixel signals from the first memory means 8 at sampling frequency fs, and calculates luminance signals $Y2_{11}$, $Y2_{12}$, ... of each pixel, according to formula 6, from signals $R_{21}$, $R_{22}$, ... of red pixel R, signals $G_{11}$, $G_{12}$, ... of green pixel G, and signals $B_{21}$, $B_{22}$, ... of blue pixel B, and issues the calculated results as Y2 signal at sampling frequency 2fs.

On the other hand, the interpolation calculation circuit 416 interpolates based on the interpolation coefficients k1=½ and k2=½ from the interpolation coefficient generator 28 since it is the taking still picture mode at the present. Herein, the interpolation calculation circuit 416 interpolates R signal and B signal as indicated by $R_{21}'$ and $B_{21}'$, ..., in formula 8. The spatial positions of R signal and B signal after interpolation calculation are shifted by the portion of ½ pixel in the horizontal direction and in vertical direction as compared with the spatial positions before interpolation calculation, supposing the pixel interval of R signal and B signal of the input of the interpolation calculation circuit 416 to be 1.

$R_{21}'=(R_{21}+R_{31}+R_{22}+R_{32})/4$ $B_{21}'=(B_{21}+B_{31}+B_{22}+B_{32})/4$ [formula 8]

In this taking still picture mode, the R and B signals and G signal from the interpolation calculation circuit 416 are shifted from the R, G, and B output signals from the selector 414, by half pixel in the horizontal and in vertical directions, and therefore by this calculation, the spatial positions of R and B signals from the interpolation calculation circuit 416 are matched with the positions of G signal both in horizontal and in vertical directions. Further, the G signal is processed by low pass filtering operation as shown in formula 9.

$$G_{21}'=(Gm_{11}+6Gm_{21}+Gm_{31})/8 \qquad \text{[formula 9]}$$

where $$Gm_{11}=(G_{10}+6G_{11}+G_{12})/8$$

$$Gm_{21}=(G_{20}+6G_{21}+G_{22})/8$$

$$Gm_{31}=(G_{30}+6G_{31}+G_{32})/8$$

Figure 12:
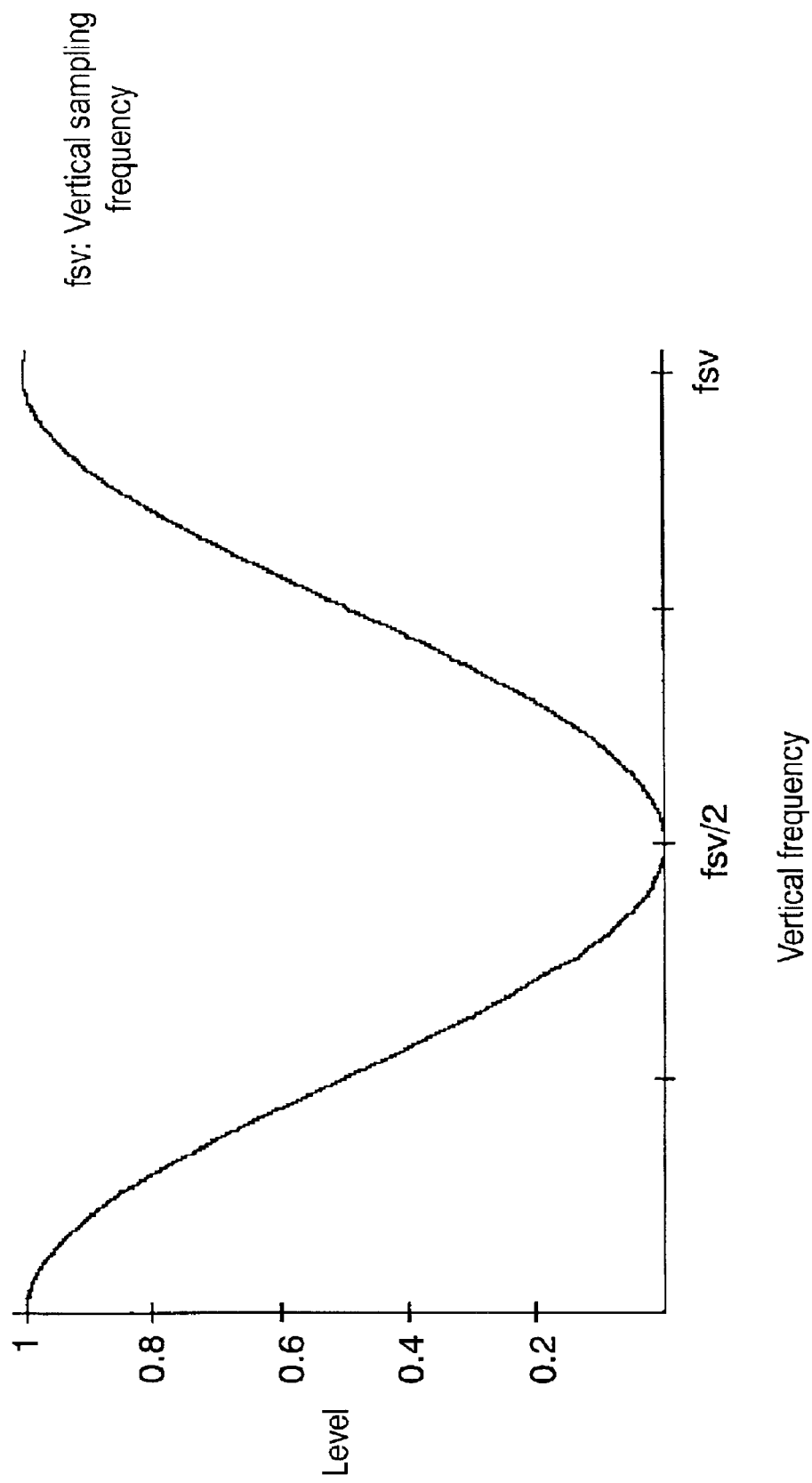
FIG. 12 is a vertical frequency characteristic diagram of R and B signals in still picture taking issued from the interpolation calculating circuit in FIG. 11.
Figure 13:
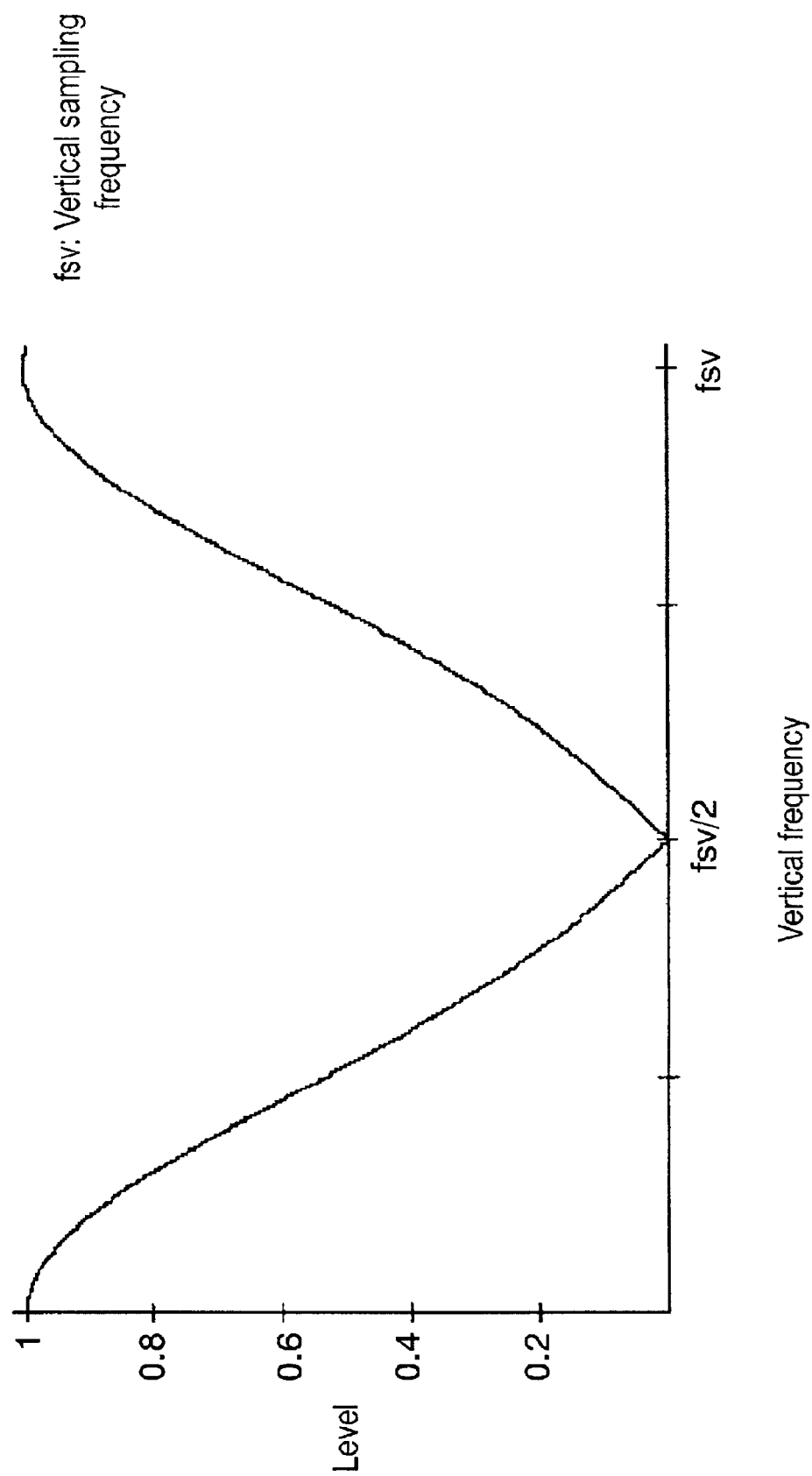
FIG. 13 is a vertical frequency characteristic diagram of G signal issued from the interpolation calculating circuit in FIG. 11.
Figure 14:
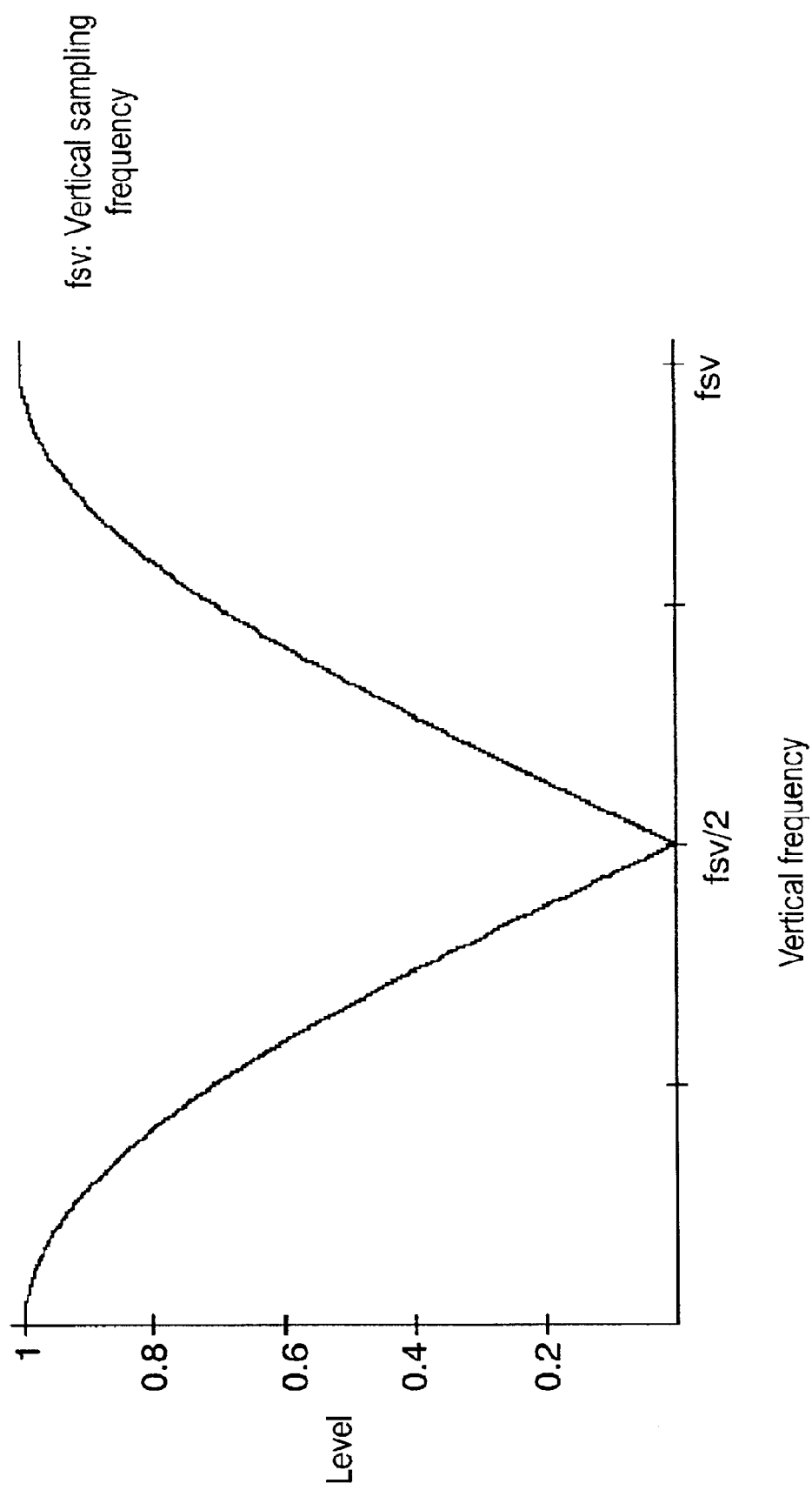
FIG. 14 is a vertical frequency characteristic diagram of R, G, and B signals entered in the interpolation calculating circuit in FIG. 11.

FIG. 12 shows a vertical frequency characteristic of R signal and B signal of the output of the interpolation calculation circuit 416, and FIG. 13 shows a vertical frequency characteristic of G signal of the output of the interpolation calculation circuit 416. FIG. 14 shows a frequency characteristic of R, G, and B signals of output from the selector 414. Thus, by interpolation calculation, in other words, low pass filter (LPF) operation, it is known that the characteristics of vertical frequency component are matched very well among the R signal, B signal, and G signal with each other.

This is the same in the horizontal direction, and the explanation in the horizontal direction is omitted.

As a result, the C matrix circuit 417 produces C signal from red signals $R_{21}'$, $R_{22}'$, ..., green signals $G_{21}'$, $G_{22}'$, ..., and blue signals $B_{21}'$, $B_{22}'$, ... issued from the interpolation calculation circuit 416. This C signal is suppressed, therefore, in generation of spurious color.

The Y and C signals thus produced in the Y signal matrix circuit 5 and C signal matrix circuit 7 are put into the horizontal zoom circuit 501, which converts the Y and C signals into signals having square pixels.

The Y signal outputs from the second memory 9 are issued alternately starting from the Y2 signal positioned higher in the space, in the sequence of Y2 signal, Y1 signal, Y2 signal, Y1 signal, and Y2 signal . . . , successively. As a result, the Y signal is put into a selector 71 as luminance signal having vertical 960 pixels.

On the other hand, the interlace corrector 10 receives C signal output of vertical 480 pixels from the second memory 9.

The interlace corrector 10 interpolates the C signal of vertical 480 pixels in the vertical direction, and issues C signal of vertical 960 pixels to the selector 71.

The taking moving picture mode is explained below. For the sake of simplicity, herein, it is explained that the adjacent vertical pixels in a CCD are not driven simultaneously and the output signals from adjacent vertical pixels are not added up to each other.

When taking a moving picture, the image sensing device must issue moving picture signals during one field period. First, the CCDs 101, 102, and 103, analog processing circuit 2, and A/D converters 301, 302, and 303 operate same as in the case of taking still picture mode explained above. The selector 414 receives a mode setting signal from the mode setting circuit 411, and selects the output signal from the A/D converters 301, 302, and 303, and issues them to a later stage, where it is the taking moving picture mode at the present. The Y signal matrix circuit 417 calculates the matrix of formula 1 in odd fields, and calculates the matrix of formula 5 in even fields, so as to determine the amplitude of pixel signals of Y1 signal. The sampling frequency converter 6 issues this Y1 signal at sampling frequency 2fs. As a result, the sampling frequency converter 6 obtains the Y1 signal corresponding to G signal having a double number of pixels in the horizontal direction. That is, when R, G, and B pixel signals correspond to horizontal 768 pixels, the Y1 signal is a signal of high picture quality corresponding to horizontal 1536 pixels.

On the one hand, in the interpolation calculation circuit 416, the interpolation coefficient generator 28 (shown in FIG. 11) receives a mode setting signal from the mode setting circuit 411, and generates interpolation coefficients k1=¼ and k2=¾, in the case that it is the taking moving picture mode at the present. In this case, therefore, different from the case of taking still picture, the interpolation calculation circuit 416 calculates the $R_{31}''$ signal, $B_{31}''$ signal, and $G_{31}''$ signal according to formula 10 in odd fields, and the interpolation calculation circuit 416 calculates the $R_{21}''$ signal, $B_{21}''$ signal, and $G_{21}''$ signal according to formula 11 in even fields. As a result, the spatial positions of R signal and B signal after interpolation calculation are shifted by ¼ pixel space in the vertical direction, and by ½ pixel spaces in the horizontal direction compared with the spatial positions before interpolation calculation, supposing the pixel interval of R signal and B signal before the interpolation calculation to be 1, same as in the case of taking still picture.

$$R_{31}''=(3R_{31}+R_{51}+3R_{32}+R_{52})/8$$

$$B_{31}''=(3B_{31}+B_{51}+3B_{32}+B_{52})/8$$

$$G_{31}''=(Gm_{11}+6Gm_{31}+Gm_{51})/8 \qquad \text{[formula 10]}$$

where $$Gm_{11}=(G_{10}+6G_{11}+G_{12})/8$$

$$Gm_{31}=(G_{30}+6G_{31}+G_{32})/8$$

$$Gm_{51}=(G_{50}+6G_{51}+G_{52})/8$$

$$R_{21}''=(3R_{21}+R_{41}+3R_{22}+R_{42})/8$$

$$B_{21}''=(3B_{21}+B_{41}+3B_{22}+B_{42})/8$$

$$G_{21}''=(Gm_{01}+6Gm_{21}+Gm_{41})/8 \qquad \text{[formula 11]}$$

where $$Gm_{01}=(G_{00}+6G_{01}+G_{02})/8$$

$$Gm_{21}=(G_{20}+6G_{21}+G_{22})/8$$

$$Gm_{41}=(G_{40}+6G_{61}+G_{42})/8$$

Figure 15:
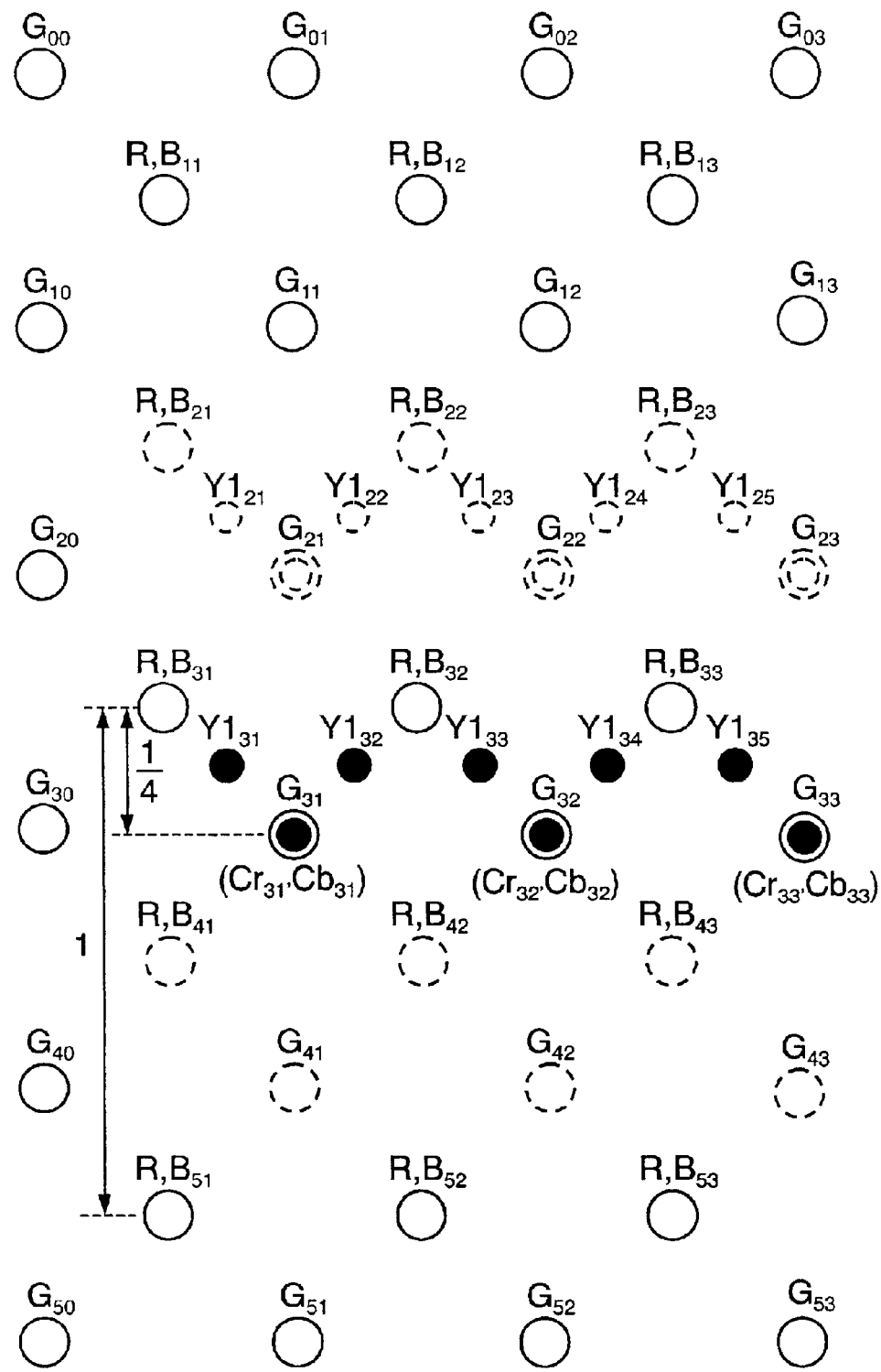
FIG. 15 is a schematic diagram showing a spatial configuration of pixels in moving image taking in the embodiment of the invention in FIG. 10.

FIG. 15 shows a spatial configuration of pixels of CCDs when taking a moving picture and generated Y signal and C signal. In this drawing, C signals are indicated as Cr(=R−Y) and Cb(=B−Y) which are color difference signals. These color difference signals are similar to the chrominance signal C, which has been explained in the aforesaid drawings and explanations.

In this taking moving picture mode, R, G, and B output signals from the selector 414 are, for example in odd fields, respectively red signals $R_{11}$, $R_{31}$, . . . , green signals $G_{11}$, $G_{31}$, . . . , and blue signals $B_{11}$, $B_{31}$, . . . , being shifted by ½ pixel in the horizontal direction and by ¼ pixel in the vertical direction. These R signals, B signals, and G signals shifted in spatial positions are matched with the spatial positions after interpolation calculation.

Figure 16:
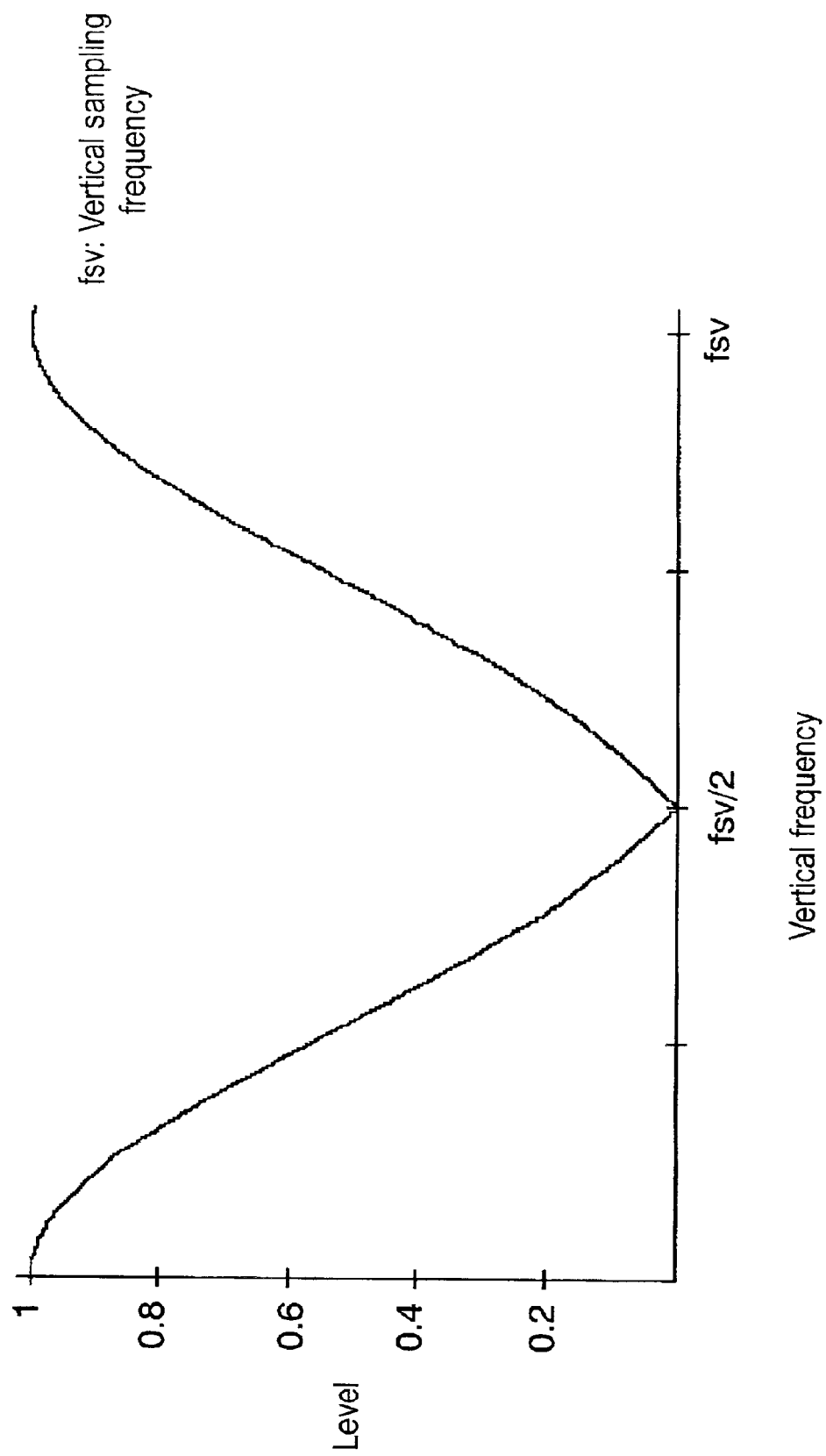
FIG. 16 is a vertical frequency characteristic diagram of R and B signals in moving picture taking issued from the interpolation calculating circuit in FIG. 11.

FIG. 16 shows a vertical frequency characteristic of R signal and B signal of the output from the interpolation calculation circuit 416. The interpolation calculation circuit 416 calculates the G signal by LPF operation according to formula 9 same as in the case of taking still picture, so as to obtain a frequency characteristic as shown in FIG. 13. As a result, the R signal, B signal, and G signal of the output of the interpolation calculation circuit 416 are almost matched also in the vertical frequency characteristic with the R signal, B signal, and G signal of the output of the selector 414. The horizontal frequency characteristic is the same as in the case of taking still picture.

The C signal matrix circuit 417 obtains red chrominance signal Cr and blue chrominance signal Cb by matrix calculation according to formula 12 in odd fields, and obtains red chrominance signal Cr and blue chrominance signal Cb by matrix calculation according to formula 13 in even fields, from R, G and B signals matched in the spatial position and frequency component both in horizontal direction and in vertical direction. In this moving picture taking mode, too, the C signal matrix circuit 417 obtains C signal suppressed in generation of spurious color same as in the case of taking still picture mode. Meanwhile, since the C signal is same as G signal in the number of pixels, then supposing the number of pixels of CCD to be horizontal 768 pixels, the number of pixels of C signal is horizontal 768 pixels.

$$Cr_{31}=0.70R_{31}''-0.59G_{31}''-0.11B_{31}''$$

$$Cb_{31}=-0.70R_{31}''-0.59G_{31}''+0.89B_{31}'' \quad \text{[formula 12]}$$

$$Cr_{21}=0.70R_{21}''-0.59G_{21}''-0.11B_{21}''$$

$$Cb_{21}=-0.70R_{21}''-0.59G_{21}''+0.89B_{21}'' \quad \text{[formula 13]}$$

The selector 71 receives a mode setting signal from the mode setting circuit 411, and selects the output of the sampling frequency converter 6, in the case that it is the taking moving picture mode at the present. The image sensing device issues a moving picture signal from the selector 71. As a result, the image sensing device obtains interlacing moving picture signals in horizontal 720 pixels and in vertical 480 pixels, having little spurious color same as in taking still picture mode.

As explained herein, the embodiment in FIG. 10 brings about the following merits: R signal, B signal, and G signal used in generation of C signal are matched in the spatial position and in frequency component both for taking moving picture and for taking still picture, and therefore the image sensing device of the embodiment can produce images little in spurious colors both in moving picture and in still picture of high resolution; and as the image sensing device of the embodiment changes over the high resolution still picture and moving picture only by changing the zoom factor of the selector and horizontal zoom circuit, so it does not require vertical zoom circuit for converting the resolution in vertical direction.

Figure 17:
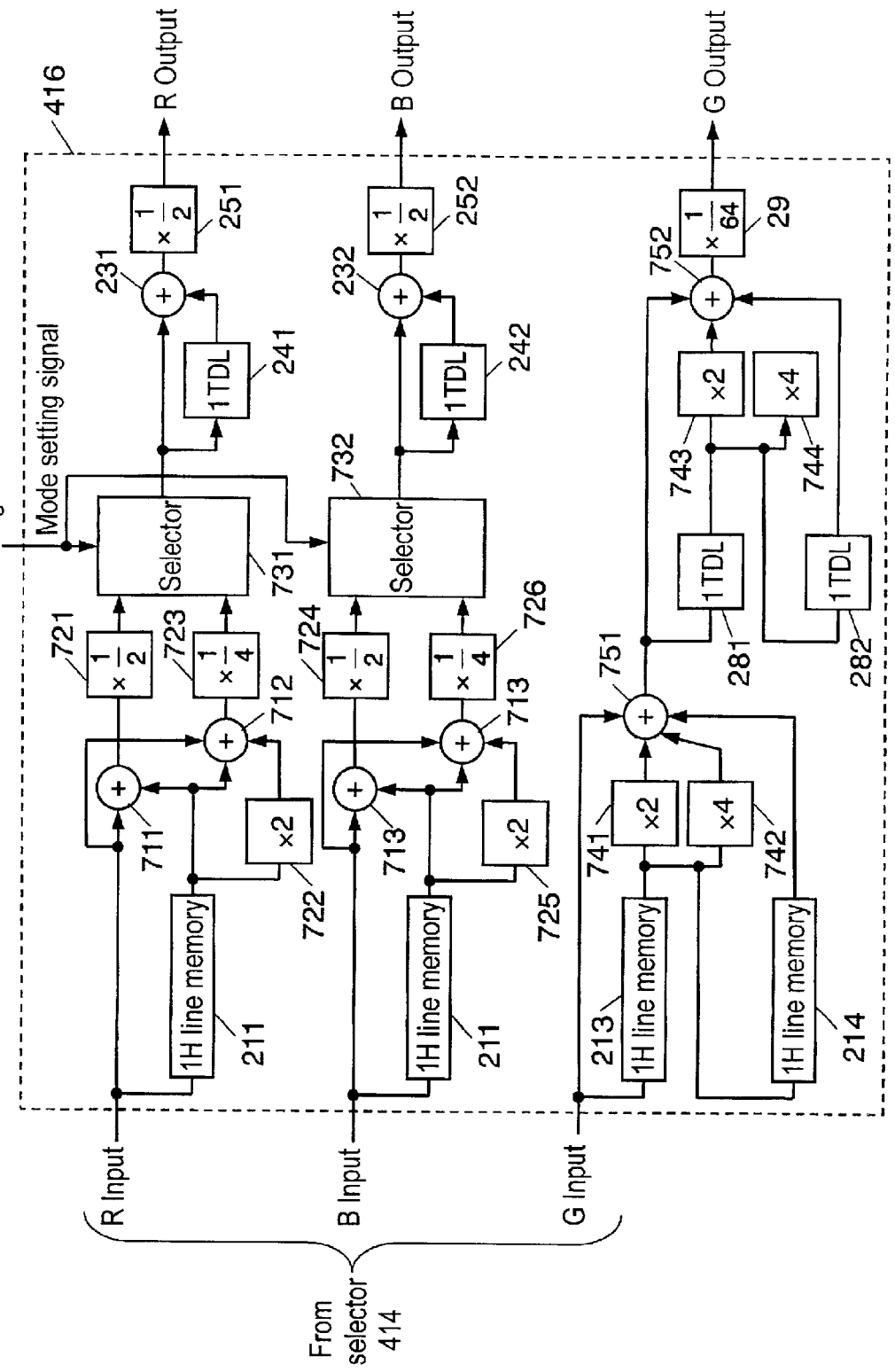
FIG. 17 is a diagram showing other example of the interpolation calculating circuit.
Figure 18:
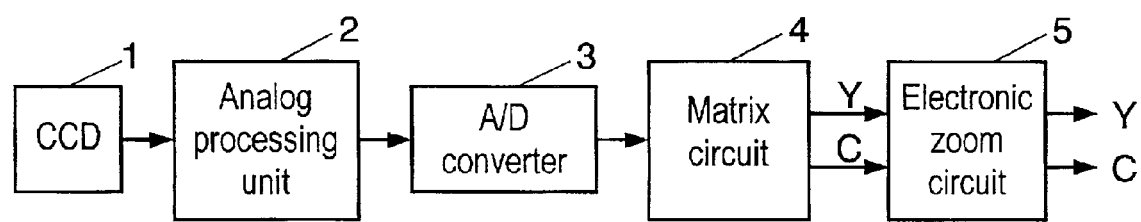
FIG. 18 is a block diagram of a conventional image sensing device.

FIG. 17 shows other embodiment of the interpolation calculation circuit 416. Although the interpolation calculation circuit 416 of FIG. 11 comprises six multipliers 221, 222, 223, 224, 261, and 271, but those multipliers 221, 222, 223, and 224 of FIG. 11 are replaced by the adders 711, 712, 713, and 714, bit shifters 721, 722, 723, 724, 725, and 726, and selectors 731 and 732 as shown in FIG. 17. Thus, the mode setting signal from the mode setting circuit 411 may change over the outputs of the selectors 731 and 732. Alternatively, in the interpolation calculation circuit 416, the multipliers 261 and 262 in FIG. 11 may be replaced by bit shifters 741 and 742, and, 743 and 744, and adders 751 and 752. The configuration shown in FIG. 17 can be curtailed in the circuit scale, because the digital multiplication is executed by bit shifters and adders.

In the interpolation calculation circuit 416 of the embodiment, the interpolation calculation and LPF operation for R signal, G signal, and B signal can be carried out by using formula 8 and formula 9 in taking still picture, and by using formula 10 and formula 11 in taking moving picture. The formulas are not, however, limited to these, but any other formulas may be used as far as the spatial position and frequency characteristics in the horizontal and in vertical directions after calculation are matched the R signal, B signal, and G signal with each other.

In the illustrated embodiments, the adjacent vertical pixels of interlacing CCDs are not driven simultaneously in taking moving picture mode, but the same effects are obtained in the case of driving the adjacent vertical pixels simultaneously, such as pixels $G_{11}$, and $G_{21}$, $G_{31}$ and $G_{41}$, . . . in odd fields, or $G_{21}$ and $G_{31}$, $G_{41}$ and $G_{51}$, . . . in even fields.

In the embodiment, the first memory 8 and second memory 9 are seperated, but same effects are obtained when the two memories are realized by one memory having two different regions therein.

In the explanation of the embodiment, for the convenience of explanation, the pixels of CCD for G are shifted by ½ pixel in the horizontal and vertical directions, from pixels of CCDs for R and B. Actually, however, due to effects of chromatic aberration of the optical system or the like, the physical spatial position of ½ pixel on the CCD photo detecting surface and the optical spatial position of ½ pixel do not always coincide with each other. Therefore, the pixels of CCD for G should be shifted from pixels of CCDs for R and B in the horizontal direction and vertical direction, preferably by optical ½ pixel, instead of physical ½ pixel.

Thus, according to the embodiment in FIG. 10, spatial positions of R and B signals of the output of the interpolation calculation circuit corresponding to the R and B signals of the input of the interpolation calculation circuit are shifted by a specific interval in the moving picture taking and still picture taking. Therefore, the image sensing device of the embodiment has the following merits: in moving picture taking and still picture taking, the G signal is matched in space and frequency with the R signal and B signal used in creation of C signal; and as a result, the image sensing device of the embodiment can produce a picture of high quality and small in spurious color in both moving picture and high-resolution still picture.

The image sensing device of the invention has the following advantages: the angle of view is not changed between the moving picture taking and still picture taking modes; the CCD driving frequency is equalized between the still picture taking and moving picture taking modes; the driving frequency is not so high, and the power consumption is suppressed; in the three-CCD system of the invention, the number of pixels of CCD necessary for still picture is ¼ that of the single-CCD type; as a result, in the optical system of a same size, the pixel area can be increased up to 4 times that of the single-CCD system, and it is advantageous in the aspect of the sensitivity, that is, the S/N ratio; and to the contrary, when the sensitivity is the same, the size of the optical system can be reduced, so that the camera or device is reduced in size.

In the embodiment, the CCD for G is deviated from the CCDs for R and B in the horizontal and vertical directions, and two lines of Y signals having a double number of pixels of R, G, B in the horizontal direction and positioned at ½ pixel deviation in the vertical direction are created by parallel processing. The image sensing device issues two luminance signals Y1 and Y2 by storing in the memory in still picture taking, and issues only one luminance signal Y1 in moving picture taking by converting the sampling frequency.

Therefore, in addition to the benefits of the foregoing embodiments, this image sensing device has the following merits: in this image sensing device, the majority of circuits for moving picture processing and high-definition still picture processing can be commonly used; and the image sensing device is capable of performing moving picture processing and high-definition still picture processing simultaneously, so that a high-definition still picture can be taken simultaneously while taking a moving picture.

Further, according to other embodiments, the image sensing device shifts the spatial positions of R and B signals of the output of the interpolation calculation circuit to the R and B signals of the input of the interpolation calculation circuit by a specific interval between the moving picture taking and still picture taking.

Therefore, the image sensing device of the embodiment brings about the following merits: in moving picture taking and still picture taking, the G signal is matched in space and frequency with the R signal and B signal used in creation of C signal; and as a result, the image sensing device of the embodiment can produce a picture of high quality and small in spurious color in both moving picture and high-resolution still picture.

What is claimed is:

1. An image sensing device comprising:
    a) image sensing means having individual image sensing elements for red (R), green (G), and blue (B), in which three image sensing elements are arranged in an obliquely shifted disposition so that the image sensing element for G may be shifted from the image sensing elements for R and B by Ph/2+a and Pv/2+b, respectively, in the horizontal and vertical direction where Ph and Pv are pixel arrangement intervals of the image sensing elements in the horizontal and vertical direction respectively, a and b are positive constants satisfying the relation of 0<a<Ph/2 and 0<b<Pv/2;
    b) luminance signal generating means, which processes the output signal of the image sensing means in such way
        i) that said luminance signal generating means may generate a first luminance signal of which number of pixels in the horizontal direction is 2 times that of the image sensing element for G by using pixel signals of the image sensing elements for R and B and the signal from the pixel of the image sensing element for G positioned at one of the closest lower left position and closest lower right position in space to the image sensing elements for R and B, and
        ii) that said luminance signal generating means may generate a second luminance signal of which number of pixels in the horizontal direction is 2 times that of the image sensing element for G by using pixel signals of the image sensing elements for R and B and the signal from the pixel of the image sensing element for G positioned at one of the closest upper left position and closest upper right position in space to the latter image sensing elements for R and B;
    c) sampling frequency converting means, which reduces at least one sampling frequency in the horizontal direction and vertical direction of the first luminance signal at a specified ratio, and generates as a third luminance signal; and
    d) second memory means, which stores the first luminance signal and second luminance signal, and issues the first luminance signal and second luminance signal alternately in every line,
    wherein the output signal of said sampling frequency converting means is a moving picture image sensing output, and the output of said second memory means is a still picture image sensing output.

2. The image sensing device of claim 1,
    wherein said image sensing means comprises first memory means for storing output signals for all pixels of the image sensing elements for R, G and B, and output signals from the image sensing elements for R, G and B are used as moving picture signal when taking a moving picture, whereas output signals for all pixels stored in the first memory means are used as still picture signal when taking a still picture.

3. The image sensing device of claim 1 or 2, further comprising:
    selecting means for selecting and issuing one of the output signal of the sampling frequency converting means and the output signal of the second memory means,
    wherein said selecting means selects the output signal of the sampling frequency converting means as moving picture signal when taking a moving picture, and the selecting means selects the output signal of the second memory means when taking a still picture.

4. The image sensing device of claim 2, further comprising:
    selecting means for selecting and issuing one of the output signal of the sampling frequency converting means and the output signal of the second memory means,
    wherein i) said selecting means selects and issues the output signals of the image sensing elements for R, G and B, through the luminance signal generating means and sampling frequency converting means, when taking a moving picture,
    ii) in a transition period from taking moving picture to taking still picture, the selecting means selects and issues the signal of the second memory means through the luminance signal generating means and sampling frequency converting means, and
    iii) the selecting means selects and issues the output signal of the second memory means when taking a still picture.

5. The image sensing device of claim 4, further comprising:
    recording means for recording the output signal of the selecting means in a recording medium, and
    display means for displaying the output signal from the recording means,
    wherein the image sensing device displays the video signal in the display means while recording in the recording medium of the recording means in taking moving picture and taking still picture, and in a transition period from taking moving picture to taking still picture, the image sensing device displays the video signal in the display means without recording in the recording medium of the recording means.

6. The image sensing device of claim 2, further comprising:
    interpolating means for interpolating the selected signal in the vertical direction, and obtaining an interpolation output signal corresponding to an arbitrary spatial position, and
    chrominance signal generating means for generating a chrominance signal from the output signal of the interpolating means,
    wherein the interpolating means issues an interpolation output signal corresponding to a position different in a spatial position by a specific interval between taking moving picture and taking still picture.

7. The image sensing device of claim 6, wherein said interpolating means issues an interpolation output signal corresponding to a position different in a spatial position by a ¼ pixel pitch in the vertical direction between taking moving picture and taking still picture.

8. The image sensing device of claim 2, wherein said image sensing elements are driven by interlace scanning.

9. The image sensing device of claim 1, wherein said image sensing elements are driven by progressive scanning.

10. The image sensing device of claim 1, wherein the image sensing element for G is shifted from the image sensing elements for R and G by Ph/2 and Pv/2, respectively, in the horizontal direction and vertical direction.

11. An image sensing device comprising:

a) image sensing means having individual image sensing elements for red (R), green (G), and blue (B), in which three image sensing elements are arranged in an obliquely shifted disposition so that the image sensing element for G may be shifted from the image sensing elements for R and B by Ph/2+a and Pv/2+b, respectively, in the horizontal and vertical direction where Ph and Pv are pixel arrangement intervals of the image sensing elements in the horizontal and vertical direction respectively, a and b are positive constants satisfying the relation of 0<a<Ph/2 and 0<b<Pv/2;

b) luminance signal generating means, which processes the output signal of the image sensing means in such way i) that said luminance signal generating means may generate a first luminance signal of which number of pixels in the horizontal direction is 2 times that of the image sensing element for G by using pixel signals of the image sensing elements for R and B and the signal from the pixel of the image sensing element for G positioned at one of the closest lower left position and closest lower right position in space to the image sensing elements for R and B, and ii) that said luminance signal generating means may generate a second luminance signal of which number of pixels in the horizontal direction is 2 times that of the image sensing element for G by using pixel signals of the image sensing elements for R and B and the signal from the pixel of the image sensing element for G positioned at one of the closest upper left position and closest upper right position in space to the latter image sensing elements for R and B;

c) sampling frequency converting means, which reduces at least one of sampling frequencies in the horizontal direction and vertical direction of the first luminance signal at a specified ratio, and generates as a third luminance signal; and d) third memory means having a first output port and a second output port, which stores the first luminance signal, second luminance signal, and third luminance signal, wherein said third memory means i) issues the third luminance signal from the first output port, sequentially in one of every line and every other line, and ii) issues the first luminance signal and second luminance signal from the second output port alternately in every line.

* * * * *